United States Patent
Raad et al.

(10) Patent No.: US 10,730,553 B2
(45) Date of Patent: Aug. 4, 2020

(54) ADAPTIVE STEERING CONTROL FOR ROBUSTNESS TO ERRORS IN ESTIMATED OR USER-SUPPLIED TRAILER PARAMETERS

(71) Applicant: Ford Global Technologies, LLC, Dearborn, MI (US)

(72) Inventors: Joseph M. Raad, Farmington, MI (US); Tyler Daavettila, Howell, MI (US); Brian George Buss, Ypsilanti, MI (US); Donald Jacob Mattern, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 288 days.

(21) Appl. No.: 15/717,210

(22) Filed: Sep. 27, 2017

(65) Prior Publication Data
US 2019/0092388 A1 Mar. 28, 2019

(51) Int. Cl.
*B62D 13/06* (2006.01)
*B62D 15/02* (2006.01)
*B62D 13/00* (2006.01)

(52) U.S. Cl.
CPC .......... *B62D 13/06* (2013.01); *B62D 13/005* (2013.01); *B62D 15/024* (2013.01); *B62D 15/025* (2013.01)

(58) Field of Classification Search
CPC ...... B62D 13/06; B62D 13/00; B62D 13/005; B62D 15/024; B62D 15/025; B62D 53/00; B62D 12/02
See application file for complete search history.

(56) References Cited

U.S. PATENT DOCUMENTS

| | | |
|---|---|---|
| 3,542,390 A | 11/1970 | Fikse |
| 3,756,624 A | 9/1973 | Taylor |
| 3,860,257 A | 1/1975 | Mesly |
| 4,042,132 A | 8/1977 | Bohman et al. |
| 4,735,432 A | 4/1988 | Brown |
| 4,752,080 A | 6/1988 | Rogers |
| 4,848,499 A | 7/1989 | Martinet et al. |
| 5,001,639 A | 3/1991 | Breen |

(Continued)

FOREIGN PATENT DOCUMENTS

| | | |
|---|---|---|
| CN | 202159367 U | 3/2012 |
| DE | 3931518 A1 | 4/1991 |

(Continued)

OTHER PUBLICATIONS

Haviland, G S, "Automatic Brake Control for Trucks—What Good Is It?", TRID, Society of Automotive Engineers, Sep. 1968, 1 pg.

(Continued)

*Primary Examiner* — Donald J Wallace
(74) *Attorney, Agent, or Firm* — Raymond Coppiellie; Price Heneveld LLP

(57) ABSTRACT

A system for assisting in reversing of a vehicle-trailer combination includes a vehicle steering system and a controller. The controller outputs a steering signal to the steering system to maintain the vehicle-trailer combination along a straight backing path and determines a straight-backing offset of a hitch angle in the vehicle-trailer combination as a proportion of an integral of a measured characteristic of the vehicle-trailer combination that varies from a desired zero value.

17 Claims, 9 Drawing Sheets

(56) References Cited

U.S. PATENT DOCUMENTS

| | | |
|---|---|---|
| 5,108,158 A | 4/1992 | Breen |
| 5,246,242 A | 9/1993 | Penzotti |
| 5,247,442 A | 9/1993 | Kendall |
| 5,558,350 A | 9/1996 | Kimbrough et al. |
| 5,586,814 A | 12/1996 | Steiner |
| 6,042,196 A | 3/2000 | Nakamura et al. |
| 6,056,371 A | 5/2000 | Lin et al. |
| 6,292,094 B1 | 9/2001 | Deng et al. |
| 6,351,698 B1 | 2/2002 | Kubota et al. |
| 6,389,342 B1 | 5/2002 | Kanda |
| 6,409,288 B2 | 6/2002 | Yoshida et al. |
| 6,494,476 B2 | 12/2002 | Masters et al. |
| 6,498,977 B2 | 12/2002 | Wetzel et al. |
| 6,567,731 B2 | 5/2003 | Chandy |
| 6,704,653 B2 | 3/2004 | Kuriya et al. |
| 6,838,979 B2 | 1/2005 | Deng et al. |
| 6,854,557 B1 | 2/2005 | Deng et al. |
| 7,032,705 B2 | 4/2006 | Zheng et al. |
| 7,117,077 B2 | 10/2006 | Michi et al. |
| 7,136,754 B2 | 11/2006 | Hahn et al. |
| 7,139,650 B2 | 11/2006 | Lubischer |
| 7,154,385 B2 | 12/2006 | Lee et al. |
| 7,165,820 B2 | 1/2007 | Rudd, III |
| 7,219,913 B2 | 5/2007 | Atley |
| 7,319,927 B1 | 1/2008 | Sun et al. |
| 7,546,191 B2 | 6/2009 | Lin et al. |
| 7,690,737 B2 | 4/2010 | Lu |
| 7,706,944 B2 | 4/2010 | Tanaka et al. |
| 7,715,953 B2 | 5/2010 | Shepard |
| 7,793,965 B2 | 9/2010 | Padula |
| 7,969,326 B2 | 6/2011 | Sakakibara |
| 8,010,253 B2 | 8/2011 | Lundquist |
| 8,033,955 B2 | 10/2011 | Farnsworth |
| 8,036,792 B2 | 10/2011 | Dechamp |
| 8,108,116 B2 | 1/2012 | Mori et al. |
| 8,139,109 B2 | 3/2012 | Schmiedel et al. |
| 8,170,726 B2 | 5/2012 | Chen et al. |
| 8,244,442 B2 | 8/2012 | Craig et al. |
| 8,260,518 B2 | 9/2012 | Englert |
| 8,267,485 B2 | 9/2012 | Barlsen et al. |
| 8,280,607 B2 | 10/2012 | Gatti et al. |
| 8,374,749 B2 | 2/2013 | Tanaka |
| 8,430,792 B2 | 4/2013 | Noll |
| 8,469,125 B2 | 6/2013 | Yu et al. |
| 8,571,758 B2 | 10/2013 | Klier et al. |
| 8,755,982 B2 | 6/2014 | Heckel et al. |
| 8,755,984 B2 | 6/2014 | Rupp et al. |
| 8,798,860 B2 | 8/2014 | Dechamp |
| 8,909,426 B2 | 12/2014 | Rhode et al. |
| 8,930,140 B2 | 1/2015 | Trombley et al. |
| 9,102,271 B2 | 8/2015 | Trombley et al. |
| 9,108,598 B2 | 8/2015 | Headley |
| 9,132,856 B2 | 9/2015 | Shepard |
| 9,156,496 B2 | 10/2015 | Greenwood et al. |
| 9,164,955 B2 | 10/2015 | Lavoie et al. |
| 9,180,890 B2 | 11/2015 | Lu et al. |
| 9,227,474 B2 | 1/2016 | Liu |
| 9,229,453 B1 | 1/2016 | Lee |
| 9,238,483 B2 | 1/2016 | Hafner et al. |
| 9,248,858 B2 | 2/2016 | Lavoie et al. |
| 9,315,212 B1 | 4/2016 | Kyrtsos et al. |
| 9,335,162 B2 | 5/2016 | Kyrtsos et al. |
| 9,340,228 B2 | 5/2016 | Xu et al. |
| 9,500,497 B2 | 11/2016 | Lavoie et al. |
| 9,616,923 B2 | 4/2017 | Lavoie et al. |
| 9,840,278 B2 | 12/2017 | Lavoie et al. |
| 2001/0037164 A1 | 11/2001 | Hecker |
| 2001/0052434 A1 | 12/2001 | Ehrlich et al. |
| 2004/0222881 A1 | 11/2004 | Deng et al. |
| 2005/0206224 A1 | 9/2005 | Lu |
| 2005/0206225 A1 | 9/2005 | Offerle et al. |
| 2005/0206229 A1 | 9/2005 | Lu et al. |
| 2005/0236201 A1 | 10/2005 | Spannheimer et al. |
| 2005/0236896 A1 | 10/2005 | Offerle et al. |
| 2006/0103511 A1 | 5/2006 | Lee et al. |
| 2006/0142936 A1 | 6/2006 | Dix |
| 2007/0027581 A1 | 2/2007 | Bauer et al. |
| 2007/0198190 A1 | 8/2007 | Bauer et al. |
| 2008/0177443 A1 | 7/2008 | Lee et al. |
| 2008/0231701 A1 | 9/2008 | Greenwood et al. |
| 2009/0082935 A1 | 3/2009 | Leschuk et al. |
| 2009/0157260 A1 | 6/2009 | Lee |
| 2009/0198425 A1 | 8/2009 | Englert |
| 2009/0271078 A1 | 10/2009 | Dickinson |
| 2009/0306854 A1 | 12/2009 | Dechamp |
| 2009/0306861 A1 | 12/2009 | Schumann et al. |
| 2009/0326775 A1 | 12/2009 | Nishida |
| 2010/0152989 A1 | 6/2010 | Smith et al. |
| 2011/0087398 A1 | 4/2011 | Lu et al. |
| 2012/0041658 A1 | 2/2012 | Turner |
| 2012/0095649 A1 | 4/2012 | Klier et al. |
| 2012/0200706 A1 | 8/2012 | Greenwood et al. |
| 2012/0271512 A1 | 10/2012 | Rupp et al. |
| 2012/0271514 A1 | 10/2012 | Lavoie et al. |
| 2012/0271515 A1 | 10/2012 | Rhode et al. |
| 2012/0271522 A1 | 10/2012 | Rupp et al. |
| 2012/0283909 A1 | 11/2012 | Dix |
| 2012/0310594 A1 | 12/2012 | Watanabe |
| 2012/0316732 A1 | 12/2012 | Auer |
| 2013/0148748 A1 | 6/2013 | Suda |
| 2013/0179038 A1 | 7/2013 | Goswami et al. |
| 2013/0268160 A1 | 10/2013 | Trombley et al. |
| 2014/0052337 A1 | 2/2014 | Lavoie et al. |
| 2014/0058614 A1 | 2/2014 | Trombley et al. |
| 2014/0058622 A1 | 2/2014 | Trombley et al. |
| 2014/0058655 A1 | 2/2014 | Trombley et al. |
| 2014/0058668 A1 | 2/2014 | Trombley et al. |
| 2014/0067154 A1 | 3/2014 | Yu et al. |
| 2014/0067155 A1 | 3/2014 | Yu et al. |
| 2014/0085472 A1 | 3/2014 | Lu et al. |
| 2014/0121930 A1 | 5/2014 | Allexi et al. |
| 2014/0160276 A1 | 6/2014 | Pliefke et al. |
| 2014/0172232 A1 | 6/2014 | Rupp et al. |
| 2014/0188344 A1 | 7/2014 | Lavoie |
| 2014/0188346 A1 | 7/2014 | Lavoie |
| 2014/0210456 A1 | 7/2014 | Crossman |
| 2014/0218506 A1 | 8/2014 | Trombley et al. |
| 2014/0218522 A1 | 8/2014 | Lavoie et al. |
| 2014/0222288 A1 | 8/2014 | Lavoie et al. |
| 2014/0236532 A1 | 8/2014 | Trombley et al. |
| 2014/0249691 A1 | 9/2014 | Hafner et al. |
| 2014/0249723 A1 | 9/2014 | Pilutti et al. |
| 2014/0267688 A1 | 9/2014 | Aich et al. |
| 2014/0267689 A1 | 9/2014 | Lavoie |
| 2014/0277942 A1 | 9/2014 | Kyrtsos et al. |
| 2014/0297128 A1 | 10/2014 | Lavoie et al. |
| 2014/0297129 A1 | 10/2014 | Lavoie et al. |
| 2014/0303847 A1 | 10/2014 | Lavoie |
| 2014/0309888 A1 | 10/2014 | Smit et al. |
| 2014/0324295 A1 | 10/2014 | Lavoie |
| 2014/0343795 A1 | 11/2014 | Lavoie |
| 2014/0358429 A1 | 12/2014 | Shutko et al. |
| 2014/0379217 A1 | 12/2014 | Rupp et al. |
| 2015/0025732 A1 | 1/2015 | Min et al. |
| 2015/0057903 A1 | 2/2015 | Rhode et al. |
| 2015/0066296 A1 | 3/2015 | Trombley et al. |
| 2015/0066298 A1 | 3/2015 | Sharma et al. |
| 2015/0120141 A1 | 4/2015 | Lavoie et al. |
| 2015/0134183 A1 | 5/2015 | Lavoie et al. |
| 2015/0138340 A1 | 5/2015 | Lavoie |
| 2015/0158527 A1 | 6/2015 | Hafner et al. |
| 2015/0203156 A1 | 7/2015 | Hafner et al. |
| 2015/0210317 A1 | 7/2015 | Hafner et al. |
| 2015/0217693 A1 | 8/2015 | Pliefke et al. |
| 2015/0232092 A1 | 8/2015 | Fairgrieve et al. |
| 2016/0001705 A1 | 1/2016 | Greenwood et al. |
| 2016/0009288 A1 | 1/2016 | Yu |
| 2016/0039456 A1 | 2/2016 | Lavoie et al. |
| 2016/0052548 A1 | 2/2016 | Singh et al. |
| 2016/0059888 A1 | 3/2016 | Bradley et al. |
| 2016/0129939 A1 | 5/2016 | Singh et al. |
| 2016/0229451 A1* | 8/2016 | Raad ............... B62D 13/06 |
| 2016/0257341 A1* | 9/2016 | Lavoie ............. B62D 13/06 |

(56) References Cited

U.S. PATENT DOCUMENTS

| | | |
|---|---|---|
| 2017/0101130 A1 | 4/2017 | Lavoie |
| 2017/0259850 A1 | 9/2017 | Yamashita et al. |
| 2017/0313351 A1 | 11/2017 | Lavoie |

FOREIGN PATENT DOCUMENTS

| | | |
|---|---|---|
| DE | 9208595 U1 | 8/1992 |
| DE | 10154612 A1 | 5/2003 |
| DE | 102005043466 A1 | 3/2007 |
| DE | 102005043467 A1 | 3/2007 |
| DE | 102005043468 A1 | 3/2007 |
| DE | 102006002294 A1 | 7/2007 |
| DE | 102007029413 A1 | 1/2009 |
| DE | 102006035021 B4 | 4/2010 |
| DE | 102008043675 A1 | 5/2010 |
| DE | 102009007990 A1 | 8/2010 |
| DE | 102009012253 A1 | 9/2010 |
| DE | 102010029184 A1 | 11/2011 |
| EP | 0418653 A1 | 3/1991 |
| EP | 1361543 A2 | 11/2003 |
| EP | 1655191 A1 | 5/2006 |
| EP | 1810913 A1 | 7/2007 |
| EP | 2388180 A2 | 11/2011 |
| EP | 2644477 A1 | 10/2013 |
| FR | 2515379 A1 | 4/1983 |
| JP | 09267762 A | 10/1997 |
| JP | 10119739 A | 5/1998 |
| JP | 2012166580 A | 9/2012 |
| WO | 0044605 A1 | 8/2000 |
| WO | 2012059207 A1 | 5/2012 |
| WO | 2012103193 A1 | 8/2012 |
| WO | 2013186208 A2 | 12/2013 |
| WO | 2015187467 A1 | 12/2015 |

OTHER PUBLICATIONS

M. Khatib, H. Jaouni, R. Chatila, and J.P. Laumond; "Dynamic Path Modification for Car-Like Nonholonomic Mobile Robots," IEEE, International Conference on Robotics and Automation, Albuquerque, New Mexico, Apr. 1997, 6 pages.

Altafini, C.; Speranzon, A.; Wahlberg, B., "A Feedback Control Scheme for Reversing a Truck and Trailer Vehicle", IEEE, Robotics and Automation, IEEE Transactions, Dec. 2001, vol. 17, No. 6, 2 pgs.

Claudio Altafini, Alberto Speranzon, and Karl Henrik Johansson, "Hybrid Control of a Truck and Trailer Vehicle", Springer-Verlag Berlin Heidelberg, HSCC 2002, LNCS 2289; 2002, pp. 21-34.

Divelbiss, A.W.; Wen, J.T.; "Trajectory Tracking Control of a Car-Trailer System", IEEE, Control Systems Technology, Aug. 6, 2002, vol. 5, No. 3, 1 pg.

Guanrong, Chen; Delin, Zhang; "Backing up a Truck-Trailer with Suboptimal Distance Trajectories", IEEE, Proceedings of the Fifth IEEE International Conference, vol. 2, Aug. 6, 2002, New Orleans, LA, ISBN:0-7803-3645-3, 1 pg.

F. Cuesta and A. Ollero, "Intelligent System for Parallel Parking of Cars and Tractor-Trailers", Intelligent Mobile Robot Navigation, STAR, 2005, pp. 159-188, Springer-Verlag Berlin Heidelberg.

"Understanding Tractor-Trailer Performance", Caterpillar, 2006, pp. 1-28.

C. Lundquist; W. Reinelt; O. Enqvist; "Back Driving Assistant for Passenger Cars with Trailer", ZF Lenksysteme GmbH, Schwabisch Gmünd, Germany, 2006 (SAE Int'l) Jan. 2006, pp. 1-8.

Olof Enqvist, "AFS-Assisted Trailer Reversing," Institutionen för systemteknik Deartment of Electrical Engineering, Jan. 27, 2006, 57 pgs.

Cedric Pradalier, Kane Usher, "Robust Trajectory Tracking for a Reversing Tractor-Trailer System", (Draft), Field and Service Robotics Conference, CSIRO ICT Centre, Jul. 2007, 16 pages.

Hodo, D. W.; Hung, J.Y.; Bevly, D. M.; Millhouse, S., "Effects of Sensor Placement and Errors on Path Following Control of a Mobile Robot-Trailer System", IEEE, American Control Conference, Jul. 30, 2007, 1 pg.

Cedric Pradalier, Kane Usher, "Experiments in Autonomous Reversing of a Tractor-Trailer System", 6th International Conference on Field and Service Robotics, inria-00195700, Version 1, Dec. 2007, 10 pgs.

Zhe Leng; Minor, M., "A Simple Tractor-Trailer Backing Control Law for Path Following", IEEE, Intelligent Robots and Systems (IROS) IEEE/RSJ International Conference, Oct. 2010, 2 pgs.

"2012 Edge-Trailer Towing Selector", Brochure, Preliminary 2012 RV & Trailer Towing Guide Information, 2011, 3 pgs.

"Ford Super Duty: Truck Technologies", Brochure, Sep. 2011, 2 pgs.

J. Roh; H. Lee; W. Chung, "Control of a Car with a Trailer Using the Driver Assistance System", IEEE, International Conference on Robotics and Biomimetics; Phuket, Thailand, Dec. 2011, 1 pg.

Payne, M.L.;Hung, J.Y, and Bevy, D.M; "Control of a Robot-Trailer System Using a Single Non-Collacted Sensor", IEEE, 38th Annual Conference on IEEE Industrial Electronics Society, Oct. 25-28, 2012, 2 pgs.

SH. Azadi, H.R. Rezaei Nedamani, and R. Kazemi, "Automatic Parking of an Articulated Vehicle Using ANFIS", Global Journal of Science, Engineering and Technology (ISSN: 2322-2441), 2013, pp. 93-104, Issue No. 14.

"Optionally Unmanned Ground Systems for any Steering-Wheel Based Vehicle" Universal. Unmanned., Kairos Autonomi, website: http://www.kairosautonomi.com/pronto4_system.html, retrieved Sep. 26, 2014, 2 pgs.

Micah Steele, R. Brent Gillespie, "Shared Control Between Human and Machine: Using a Haptic Steering Wheel to Aid in Land Vehicle Guidance", University of Michigan, Date Unknown, 5 pgs.

\* cited by examiner

ADAPTIVE STEERING CONTROL FOR ROBUSTNESS TO ERRORS IN ESTIMATED OR USER-SUPPLIED TRAILER PARAMETERS

FIELD OF THE DISCLOSURE

The present disclosure generally relates to steering assist technologies in vehicles and, more particularly, to a trailer backup assist system dynamically determining a hitch angle offset to improve straight backing.

BACKGROUND OF THE DISCLOSURE

It is well known that backing up a vehicle with a trailer attached is a difficult task for many drivers. This is particularly true for drivers that are untrained at backing with trailers such as, for example, those that drive with an attached trailer on an infrequent basis (e.g., have rented a trailer, use a personal trailer on an infrequent basis, etc.). One reason for such difficulty is that backing a vehicle with an attached trailer requires counter-steering that is opposite to normal steering when backing the vehicle without a trailer attached and/or requires braking to stabilize the vehicle-trailer combination before a jack-knife condition occurs. Another such reason for such difficulty is that small errors in steering while backing a vehicle with an attached trailer are amplified thereby causing the trailer to depart from a desired path.

Therefore, an approach for backing a trailer that provides a simple human machine interface and that overcomes other shortcomings of known trailer backup assist systems may be advantageous, desirable or useful.

SUMMARY OF THE DISCLOSURE

According to one aspect of the present disclosure, a system for assisting in reversing of a vehicle-trailer combination includes a vehicle steering system and a controller. The controller outputs a steering signal to the steering system to maintain the vehicle-trailer combination along a straight backing path and determines a straight-backing offset of a hitch angle in the vehicle-trailer combination as a proportion of an integral of a measured characteristic of the vehicle-trailer combination that varies from a desired zero value.

Embodiments of the first aspect of the invention can include any one or a combination of the following features:
  the controller further uses the offset of the hitch angle to dynamically adjust the steering signal;
  the steering signal further maintains a trailer of the vehicle-trailer combination on a path corresponding with a commanded curvature within the opposing ranges of curvature, and the straight backing path corresponds with a commanded curvature of zero;
  the offset of the hitch angle is due to at least one of an irregularity associated with the trailer or an error in a measurement of the hitch angle, and the measured characteristic of the vehicle-trailer combination varies from the desired zero value due to the at least one of the trailer irregularity or the error;
  the offset of the hitch angle is due to a slip in a pair of wheels in at least one of a trailer or a vehicle in the vehicle-trailer combination, and the measured characteristic of the vehicle-trailer combination varies from the desired zero value due to the slip;
  the slip in the pair of wheels occurs due to a slope in a surface beneath the pair of wheels at least partially transverse to the straight backing path;
  the system further includes a vehicle yaw rate sensor mounted to a vehicle in the vehicle-trailer combination and in communication with the controller, wherein the characteristic is a yaw rate of the vehicle, and the controller measures the yaw rate using an input from the vehicle yaw rate sensor;
  the system further includes a trailer yaw rate sensor mounted to a trailer in the vehicle-trailer combination and in communication with the controller, wherein the characteristic is a yaw rate of the trailer, and the controller measures the yaw rate using an input from the trailer yaw rate sensor;
  the vehicle steering system controls an angle of a pair of steered wheels of a vehicle in the vehicle-trailer combination and measures the angle of the pair of steered wheels during such controlling, the controller receives a measurement of the angle of the pair of steered wheels from the vehicle steering system, and the characteristic is the angle of the pair of steered wheels;
  the opposing ranges of curvature include maximum curvatures at respective ends thereof, and the controller further outputs the steering signal to the steering system to maintain the vehicle-trailer combination along a maximum-curved backing path corresponding with one of the maximum curvatures, determines a maximum-curvature offset of the hitch angle based on an error between a measured steady-state steering angle and a predicted steady-state steering angle based on the maximum curvature and interpolates a hitch angle offset function using the straight-backing offset and the maximum-curvature offset.

According to another aspect of the present disclosure, a system for assisting in reversing of a vehicle-trailer combination includes a vehicle steering system and a controller. The controller outputs a steering signal to the steering system to maintain the vehicle-trailer combination along a commanded path corresponding with opposing ranges of curvature, when the commanded path is a straight backing path corresponding with a curvature of zero, determines a straight-backing offset of a hitch angle in the vehicle-trailer combination, and, when the commanded path is a maximum-curvature path corresponding with one of two maximum curvatures at respective ends of the opposing ranges of curvature, determines a maximum-curvature offset of the hitch angle.

According to another aspect of the present disclosure, a method for assisting in reversing of a vehicle-trailer combination includes outputting a steering signal to maintain a trailer in the vehicle-trailer combination along a straight backing path, determining a straight-backing offset of a hitch angle in the vehicle-trailer combination as a proportion of an integral of a measured behavior of a characteristic of the vehicle-trailer combination that varies from a desired zero value, and dynamically adjusting the steering signal using the straight-backing offset.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
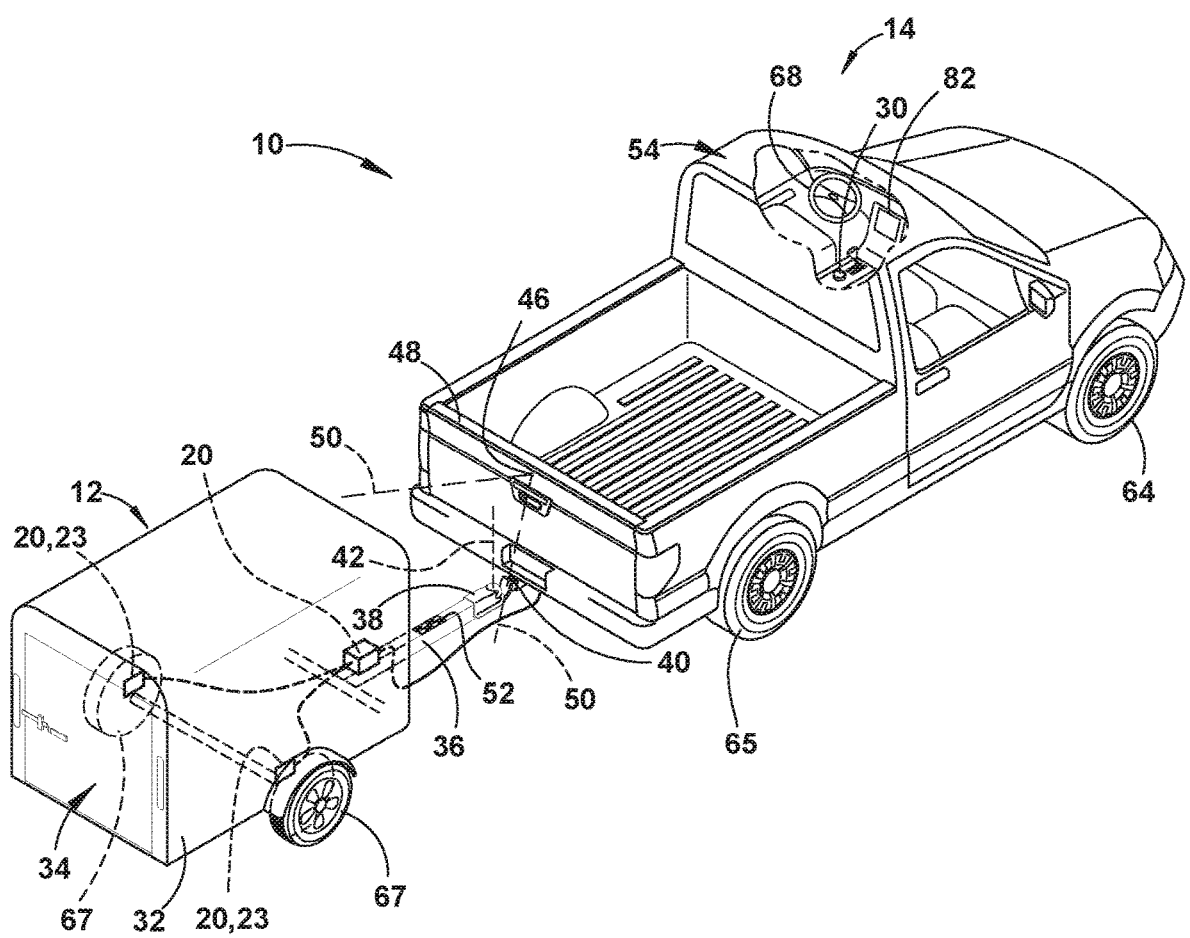
FIG. 1 is a top perspective view of a vehicle attached to a trailer with one embodiment of a hitch angle sensor for operating a trailer backup assist system.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring to FIGS. 1-11, reference numeral 10 generally designates a trailer backup assist system for assisting in reversing of a vehicle 14 and trailer 12 combination, wherein the trailer 12 is articulably coupled with the vehicle 14, such as about a hitch connection defining a hitch point 42. System 10 includes a vehicle steering system 62 and a controller 28 that outputs a steering signal to maintain the vehicle 14 and trailer 12 combination along a straight backing path $26_d$ (FIG. 10), as discussed in general with respect to FIGS. 1-8. The controller 28 further determines a straight-backing hitch angle offset $\gamma_{o,s}$ to be applied to a measured hitch angle $\hat{\gamma}$ at the hitch point 42 between the vehicle 14 and the trailer 12 as a proportion of an integral of a measured characteristic of the vehicle 14 and trailer 12 combination that varies from a predicted zero value, as discussed in greater detail with respect to FIGS. 9-11, below.

Figure 2:
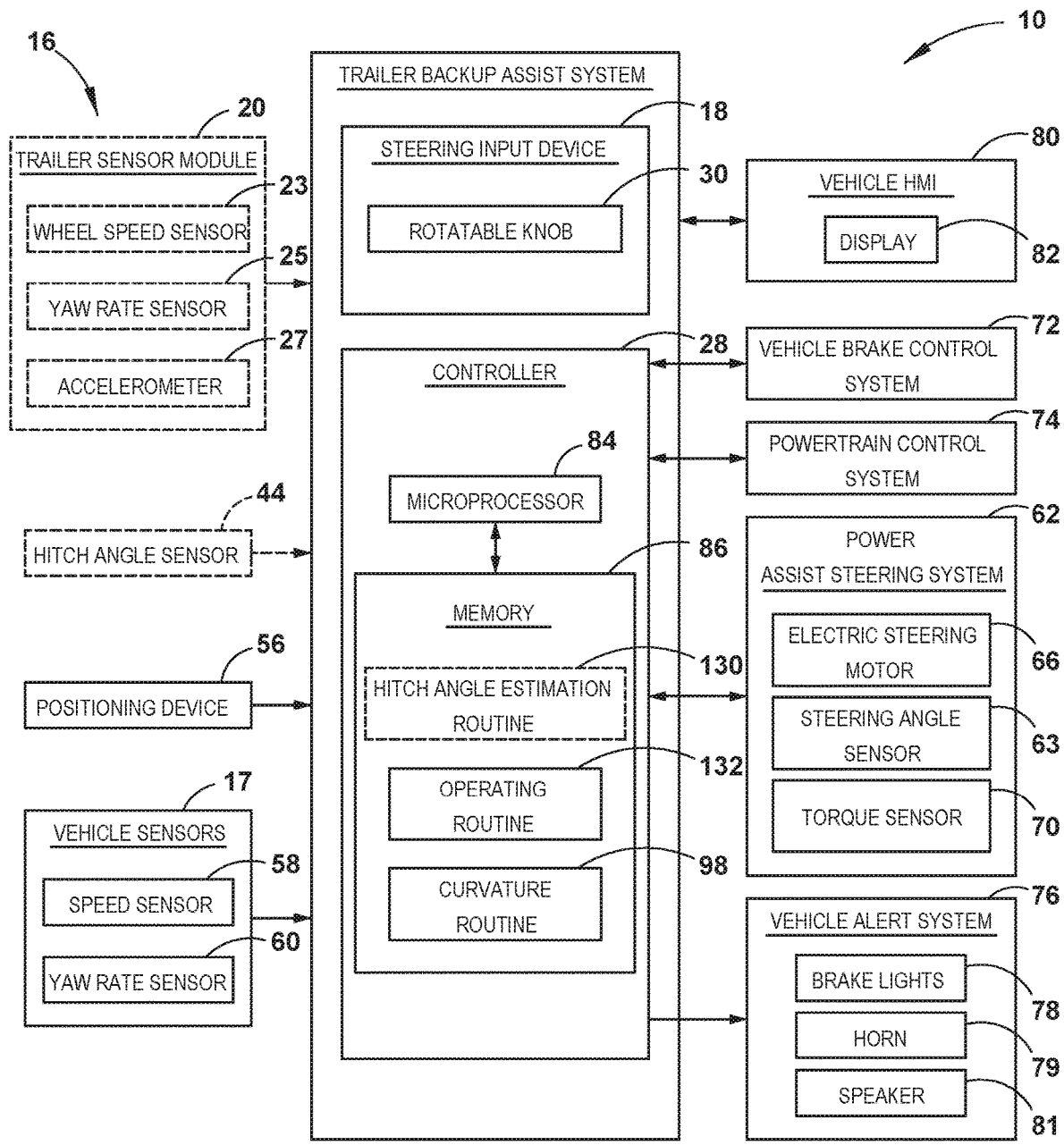
FIG. 2 is a block diagram illustrating one embodiment of the trailer backup assist.

As shown in FIGS. 1 and 2, system 10 may generally be useable for controlling a backing path 26 (FIG. 6) of a trailer 12 attached to a vehicle 14 by allowing a driver of the vehicle 14 to specify a desired curvature $\kappa_2$ of the backing path 26 of the trailer 12. In one embodiment, the trailer backup assist system 10 automatically steers the vehicle 14 to guide the trailer 12 on the desired curvature $\kappa_2$ or backing path 26 as a driver uses the accelerator and brake pedals to control the reversing speed of the vehicle 14. To monitor the position of the trailer 12 relative to the vehicle 14, the trailer backup assist system 10 may include a sensor system 16 that senses or otherwise determines a hitch angle $\gamma$ between the trailer 12 and the vehicle 14. In one embodiment, the sensor system 16 may include a hitch angle sensor 44, such as a vision-based system that employs a camera 46 on the vehicle 14 to monitor a target 52 on the trailer 12 to determine the hitch angle $\gamma$. In another embodiment, hitch angle estimates obtained using such a vision-based sensor could be combined with other measurements or estimates to further increase reliability of the overall estimated hitch angle $\gamma$. In another embodiment, the sensor system 16 may include a sensor module 20 attached to the trailer 12 that monitors the dynamics of the trailer 12, such as yaw rate, and communicates with a controller 28 of the trailer backup assist system 10 to determine the instantaneous hitch angle $\gamma$. Accordingly, one embodiment of a sensor module 20 is adapted to attach to the trailer 12 and generate a trailer yaw rate $\omega_2$. The trailer backup assist system 10 according to such an embodiment may also include a vehicle sensor system 16 that generates a vehicle yaw rate $\omega_1$ and a vehicle speed $v_1$. The controller 28 of the trailer backup assist system 10 may thereby estimate a hitch angle $\gamma$ based on the trailer yaw rate $\omega_2$, the vehicle yaw rate $\omega_1$, and the vehicle speed $v_1$ in view of a kinematic relationship between the trailer 12 and the vehicle 14.

With respect to the general operation of the trailer backup assist system 10, a steering input device 18 may be provided, such as a rotatable, or otherwise moveable, knob 30, for a driver to provide the desired curvature $\kappa_2$ of the trailer 12. As such, the steering input device 18 may be operable between a plurality of selections, such as successive rotated positions of a knob 30, that each provide an incremental change to the desired curvature $\kappa_2$ of the trailer 12. Upon inputting the desired curvature $\kappa_2$, the controller 28 may generate a steering command for the vehicle 14 to guide the trailer 12 on the desired curvature $\kappa_2$ based on the estimated hitch angle $\gamma$ and a kinematic relationship between the trailer 12 and the vehicle 14.

With reference to the embodiment shown in FIG. 1, the vehicle 14 is a pickup truck embodiment that is equipped with one embodiment of the trailer backup assist system 10 for controlling the backing path 26 (FIG. 6) of the trailer 12 that is attached to the vehicle 14. Specifically, the vehicle 14 is pivotally attached to one embodiment of the trailer 12 that has a box frame 32 with an enclosed cargo area 34, a single axle having a right wheel assembly and a left wheel assembly, and a tongue 36 longitudinally extending forward from the enclosed cargo area 34. The illustrated trailer 12 also has a trailer hitch connector in the form of a coupler assembly 38 that is connected to a vehicle hitch connector in the form of a hitch ball 40. The coupler assembly 38 latches onto the hitch ball 40 to provide a pivoting ball joint connection that defines hitch point 42 and allows for articulation of the hitch angle γ (referred to in some instances herein as an articulable coupling). It should be appreciated that additional embodiments of the trailer 12 may alternatively couple with the vehicle 14 to provide a pivoting or articulating connection, such as by connecting with a fifth wheel connector. It is also contemplated that additional embodiments of the trailer 12 may include more than one axle and may have various shapes and sizes configured for different loads and items, such as a boat trailer or a flatbed trailer.

Referring to FIGS. 1 and 2, the sensor system 16 in the illustrated embodiment includes one of a sensor module 20 or a vision-based hitch angle sensor 44 for estimating or facilitating measurement of the hitch angle γ between the vehicle 14 and the trailer 12. The illustrated hitch angle sensor 44 employs a camera 46 (e.g. video imaging camera) that may be located proximate an upper region of the vehicle tailgate 48 at the rear of the vehicle 14, as shown, such that the camera 46 may be elevated relative to the tongue 36 of the trailer 12. The illustrated camera 46 has an imaging field of view 50 located and oriented to capture one or more images of the trailer 12, including a region containing one or more desired target placement zones for at least one target 52 to be secured. Although it is contemplated that the camera 46 may capture images of the trailer 12 without a target 52 to determine the hitch angle γ, in the illustrated embodiment, the trailer backup assist system 10 includes a target 52 placed on the trailer 12 to allow the trailer backup assist system 10 to utilize information acquired via image acquisition and processing of the target 52. For instance, the illustrated camera 46 may include a video imaging camera that repeatedly captures successive images of the trailer 12 that may be processed to identify the target 52 and its location on the trailer 12 for determining movement of the target 52 and the trailer 12 relative to the vehicle 14 and the corresponding hitch angle γ. It should also be appreciated that the camera 46 may include one or more video imaging cameras and may be located at other locations on the vehicle 14 to acquire images of the trailer 12 and the desired target placement zone, such as on a passenger cab 54 of the vehicle 14 to capture images of a gooseneck trailer. Furthermore, it is contemplated that additional embodiments of the hitch angle sensor 44 and the sensor system 16 for providing the hitch angle γ may include one or a combination of a potentiometer, a magnetic-based sensor, an optical sensor, a proximity sensor, a rotational sensor, a capacitive sensor, an inductive sensor, or a mechanical based sensor, such as a mechanical sensor assembly mounted to the pivoting ball joint connection associated with hitch point 42, energy transducers of a reverse aid system, a blind spot system, and/or a cross traffic alert system, and other conceivable sensors or indicators of the hitch angle γ to supplement or be used in place of the vision-based hitch angle sensor 44.

The embodiment of the sensor module 20 illustrated in FIG. 1 can be mounted on the tongue 36 of the trailer 12 proximate the enclosed cargo area 34 and, in one example, can include left and right wheel speed sensors 23 on laterally opposing wheels 67 of the trailer 12. It is conceivable that such wheel speed sensors 23 may be bi-directional wheel speed sensors for monitoring both forward and reverse speeds. Also, it is contemplated that the sensor module 20, in additional embodiments, may be mounted on alternative portions of the trailer 12, or dispersed among trailer 12, depending on the particular sensors used therein, which in turn may vary depending on the information obtained and used from sensor module 20, if present.

The sensor module 20 can generate a plurality of signals indicative of various dynamics of the trailer 12. The signals may include a yaw rate signal, a lateral acceleration signal, and wheel speed signals that may be generated respectively by a trailer yaw rate sensor 25, an accelerometer 27, and the wheel speed sensors 23. It is conceivable that the accelerometer 27, in some embodiments, may be two or more separate sensors and may be arranged at an offset angle, such as two sensors arranged at plus and minus forty-five degrees from the longitudinal axis of the trailer 12 or arranged parallel with the longitudinal and lateral directions of the trailer 12, to generate a more robust acceleration signal, should such a signal be used by controller 28. It is also contemplated that these sensor signals could be compensated and filtered to remove offsets or drifts, and smooth out noise. Further, the controller 28 may utilize processed signals received outside of the sensor system 16, including standard signals from the brake control system 72 and the power assist steering system 62, such as vehicle yaw rate $\omega_1$, vehicle speed $v_1$, and steering angle δ, to estimate the trailer hitch angle γ, trailer speed, and related trailer parameters. As described in more detail below, the controller 28 may estimate the hitch angle γ based on the trailer yaw rate $\omega_2$, the vehicle yaw rate $\omega_1$, and the vehicle speed $v_1$ in view of a kinematic relationship between the trailer 12 and the vehicle 14. The controller 28 of the trailer backup assist system 10 may also utilize the estimated trailer variables and trailer parameters to control the steering system 62, brake control system 72, and the powertrain control system 74, such as to assist backing the vehicle-trailer combination or to mitigate a trailer sway condition.

With reference to the embodiment of the trailer backup assist system 10 shown in FIG. 2, the sensor module 20 and the hitch angle sensor 44 are provided in dashed lines to illustrate that in various embodiments one or the other may be utilized in system 10. Further, the various components useable in sensor module 20, including the wheel speed sensor 23, the trailer yaw rate sensor 25, and accelerometer 27 may be used individually or in various combinations thereof, depending on the particular implementation of hitch angle estimation routine 130 and curvature routine 98 and the information utilized thereby. The illustrated embodiment of the trailer backup assist system 10 receives vehicle 14 and trailer 12 status-related information from additional sensors and devices. This information includes positioning information from a positioning device 56, which may include a global positioning system (GPS) on the vehicle 14 or a handheld device, to determine a coordinate location of the vehicle 14 and the trailer 12 based on the location of the positioning device 56 with respect to the trailer 12 and/or the vehicle 14 and based on the estimated hitch angle γ. The positioning device 56 may additionally or alternatively include a dead reckoning system for determining the coordinate location of the vehicle 14 and the trailer 12 within a localized coordinate system based at least on vehicle speed $v_1$, steering angle δ, and hitch angle γ. Other vehicle information received by the trailer backup assist system 10 may include a speed of the vehicle 14 from a speed sensor 58 and a yaw rate $\omega_1$ of the vehicle 14 from a vehicle yaw rate sensor 60. It is contemplated that in additional embodiments, the hitch angle sensor 44 and other vehicle sensors 17 and devices may provide sensor signals or other information, such as proximity sensor signals or successive images of the trailer 12, that the controller 28 of the trailer backup assist system 10 may process with various routines to determine an indicator of the hitch angle γ, such as a range of hitch angles.

As further shown in FIG. 2, one embodiment of the trailer backup assist system 10 is in communication with a power assist steering system 62 of the vehicle 14 to operate the steered wheels 64 (FIG. 1) of the vehicle 14 for moving the vehicle 14 in such a manner that the trailer 12 reacts in accordance with the desired curvature $\kappa_2$ of the trailer 12. In the illustrated embodiment, the power assist steering system 62 is an electric power-assisted steering (EPAS) system that includes an electric steering motor 66 for turning the steered wheels 64 to a steering angle δ based on a steering command, whereby the steering angle δ may be sensed by a steering angle sensor 63 of the power assist steering system 62. The steering command may be provided by the trailer backup assist system 10 for autonomously steering during a backup maneuver and may alternatively be provided manually via a rotational position of a steering wheel 68 (FIG. 1). However, in the illustrated embodiment, the steering wheel 68 of the vehicle 14 is mechanically coupled with the steered wheels 64 of the vehicle 14, such that the steering wheel 68 moves in concert with steered wheels 64, preventing manual intervention with the steering wheel 68 during autonomous steering. More specifically, a torque sensor 70 is provided on the power assist steering system 62 that senses torque on the steering wheel 68 that is not expected from autonomous control of the steering wheel 68 and therefore indicative of manual intervention, whereby the trailer backup assist system 10 may alert the driver to discontinue manual intervention with the steering wheel 68 and/or discontinue autonomous steering.

In alternative embodiments, some vehicles have a power assist steering system 62 that allows a steering wheel 68 to be partially decoupled from movement of the steered wheels 64 of such a vehicle. Accordingly, the steering wheel 68 can be rotated independent of the manner in which the power assist steering system 62 of the vehicle controls the steered wheels 64 (e.g., autonomous steering as commanded by the trailer backup assist system 10). As such, in these types of vehicles where the steering wheel 68 can be selectively decoupled from the steered wheels 64 to allow independent operation thereof, the steering wheel 68 may be used as a steering input device 18 for the trailer backup assist system 10, as disclosed in greater detail herein.

Figure 9:
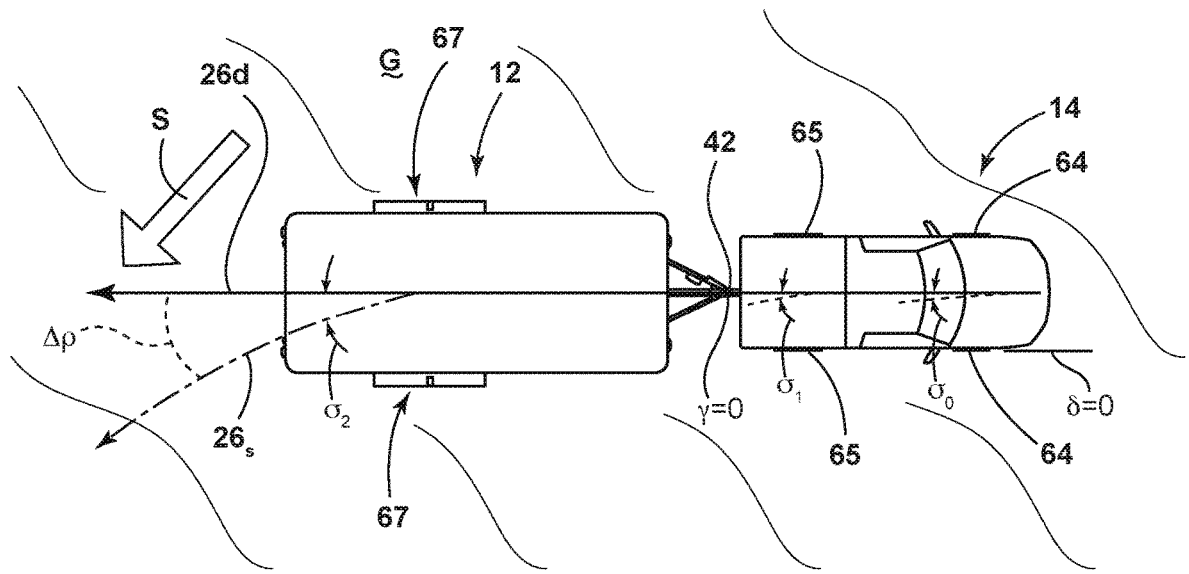
FIG. 9 is a schematic view showing a vehicle attempting to back a trailer along a straight path on a sloped ground surface.
Figure 10:
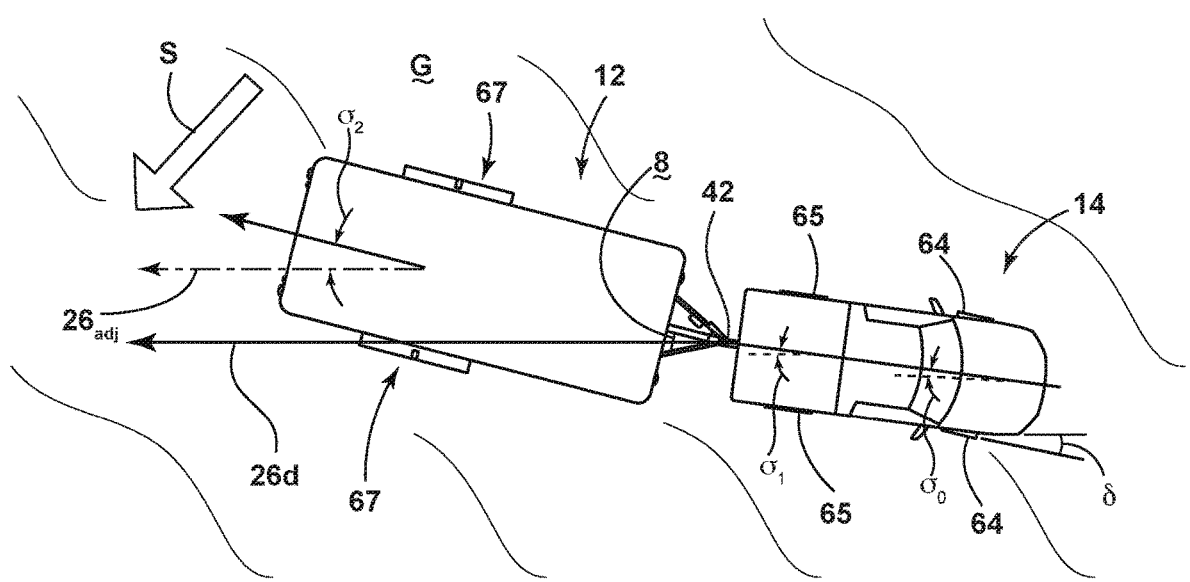
FIG. 10 is a schematic view showing the vehicle backing the trailer along an adjusted straight backing path on a sloped surface.

Referring again to the embodiment illustrated in FIG. 2, the power assist steering system 62 provides the controller 28 of the trailer backup assist system 10 with information relating to a rotational position of steered wheels 64 of the vehicle 14, including a steering angle δ. The controller 28 in the illustrated embodiment processes the current steering angle δ, in addition to other vehicle 14 and trailer 12 conditions to guide the trailer 12 along the desired curvature $\kappa_2$ (FIGS. 9 and 10). It is conceivable that the trailer backup assist system 10, in additional embodiments, may be an integrated component of the power assist steering system 62. For example, the power assist steering system 62 may include a trailer backup assist algorithm for generating vehicle steering information and commands as a function of all or a portion of information received from the steering input device 18, the hitch angle sensor 44, the power assist steering system 62, a vehicle brake control system 72, a powertrain control system 74, and other vehicle sensors and devices.

As also illustrated in FIG. 2, the vehicle brake control system 72 may also communicate with the controller 28 to provide the trailer backup assist system 10 with braking information, such as vehicle wheel speed, and to receive braking commands from the controller 28. For instance, vehicle speed information can be determined from individual wheel speeds as monitored by the brake control system 72. Vehicle speed $v_1$ may also be determined from the powertrain control system 74, the speed sensor 58, and the positioning device 56, among other conceivable means. In some embodiments, individual wheel speeds can also be used to determine a vehicle yaw rate $\omega_1$, which can be provided to the trailer backup assist system 10 in the alternative or in addition to the vehicle yaw rate sensor 60. In certain embodiments, the trailer backup assist system 10 can provide vehicle braking information to the brake control system 72 for allowing the trailer backup assist system 10 to control braking of the vehicle 14 during backing of the trailer 12. For example, the trailer backup assist system 10 in some embodiments may regulate speed of the vehicle 14 during backing of the trailer 12, which can reduce the potential for unacceptable trailer backup conditions. Examples of unacceptable trailer backup conditions include, but are not limited to, a vehicle 14 over speed condition, a high hitch angle rate, trailer angle dynamic instability, a calculated theoretical trailer jackknife condition (defined by a maximum vehicle steering angle, drawbar length, tow vehicle wheelbase, and an effective trailer length), or physical contact jackknife limitation (defined by an angular displacement limit relative to the vehicle 14 and the trailer 12), and the like. It is disclosed herein that the trailer backup assist system 10 can issue an alert signal corresponding to a notification of an actual, impending, and/or anticipated unacceptable trailer backup condition.

The powertrain control system 74, as shown in the embodiment illustrated in FIG. 2, may also interact with the trailer backup assist system 10 for regulating speed and acceleration of the vehicle 14 during backing of the trailer 12. As mentioned above, regulation of the speed of the vehicle 14 may be necessary to limit the potential for unacceptable trailer backup conditions such as, for example, jackknifing and trailer angle dynamic instability. Similar to high-speed considerations as they relate to unacceptable trailer backup conditions, high acceleration and high dynamic driver curvature requests can also lead to such unacceptable trailer backup conditions.

With continued reference to FIG. 2, the trailer backup assist system 10 in the illustrated embodiment may communicate with one or more devices, including a vehicle alert system 76, which may prompt visual, auditory, and tactile warnings. For instance, vehicle brake lights 78 and vehicle emergency flashers may provide a visual alert and a vehicle horn 79 and/or speaker 81 may provide an audible alert. Additionally, the trailer backup assist system 10 and/or vehicle alert system 76 may communicate with a human machine interface (HMI) 80 for the vehicle 14. The HMI 80 may include a vehicle display 82, such as a center-stack mounted navigation or entertainment display (FIG. 1). Further, the trailer backup assist system 10 may communicate via wireless communication with another embodiment of the HMI 80, such as with one or more handheld or portable devices, including one or more smartphones. The portable device may also include the display 82 for displaying one or more images and other information to a user. For instance, the portable device may display one or more images of the trailer 12 and an indication of the estimated hitch angle γ on the display 82. In addition, the portable device may provide feedback information, such as visual, audible, and tactile alerts.

As further illustrated in FIG. 2, the trailer backup assist system 10 includes a steering input device 18 that is connected to the controller 28 for allowing communication of information therebetween. It is disclosed herein that the steering input device 18 can be coupled to the controller 28 in a wired or wireless manner. The steering input device 18 provides the trailer backup assist system 10 with information defining the desired backing path 26 (FIG. 6) of travel of the trailer 12 for the controller 28 to process and generate steering commands. More specifically, the steering input device 18 may provide a selection or positional information that correlates with a desired curvature $\kappa_2$ of the desired backing path 26 of travel of the trailer 12. Also, the trailer steering commands provided by the steering input device 18 can include information relating to a commanded change in the path of travel, such as an incremental change in the desired curvature $\kappa_2$, and information relating to an indication that the trailer 12 is to travel along a path defined by a longitudinal centerline axis of the trailer 12, such as a desired curvature value of zero that defines a substantially straight path of travel for the trailer 12. As will be discussed below in more detail, the steering input device 18 according to one embodiment may include a movable control input device for allowing a driver of the vehicle 14 to command desired trailer steering actions or otherwise select and alter a desired curvature $\kappa_2$. For instance, the moveable control input device may be a rotatable knob 30, which can be rotatable about a rotational axis extending through a top surface or face of the knob 30. In other embodiments, the rotatable knob 30 may be rotatable about a rotational axis extending substantially parallel to a top surface or face of the rotatable knob 30. Furthermore, the steering input device 18, according to additional embodiments, may include alternative devices for providing a desired curvature $\kappa_2$ or other information defining a desired backing path 26, such as a joystick, a keypad, a series of depressible buttons or switches, a sliding input device, various user interfaces on a touch-screen display, a vision based system for receiving gestures, a control interface on a portable device, and other conceivable input devices as generally understood by one having ordinary skill in the art. It is contemplated that the steering input device 18 may also function as an input device for other features, such as providing inputs for other vehicle features or systems.

Still referring to the embodiment shown in FIG. 2, the controller 28 is configured with a microprocessor 84 to process logic and routines stored in memory 86 that receive information from the sensor system 16, including the trailer sensor module 20, the hitch angle sensor 44, the steering input device 18, the power assist steering system 62, the vehicle brake control system 72, a trailer braking system, the powertrain control system 74, and other vehicle sensors and devices. The controller 28 may generate vehicle steering information and commands as a function of all or a portion of the information received. Thereafter, the vehicle steering information and commands may be provided to the power assist steering system 62 for affecting steering of the vehicle 14 to achieve a commanded path of travel for the trailer 12. The controller 28 may include the microprocessor 84 and/or other analog and/or digital circuitry for processing one or more routines. Also, the controller 28 may include the memory 86 for storing one or more routines, including a hitch angle estimation routine 130, an operating routine 132, and a curvature routine 98. It should be appreciated that the controller 28 may be a stand-alone dedicated controller or may be a shared controller integrated with other control functions, such as integrated with the sensor system 16, the power assist steering system 62, and other conceivable onboard or off-board vehicle control systems.

Figure 3:
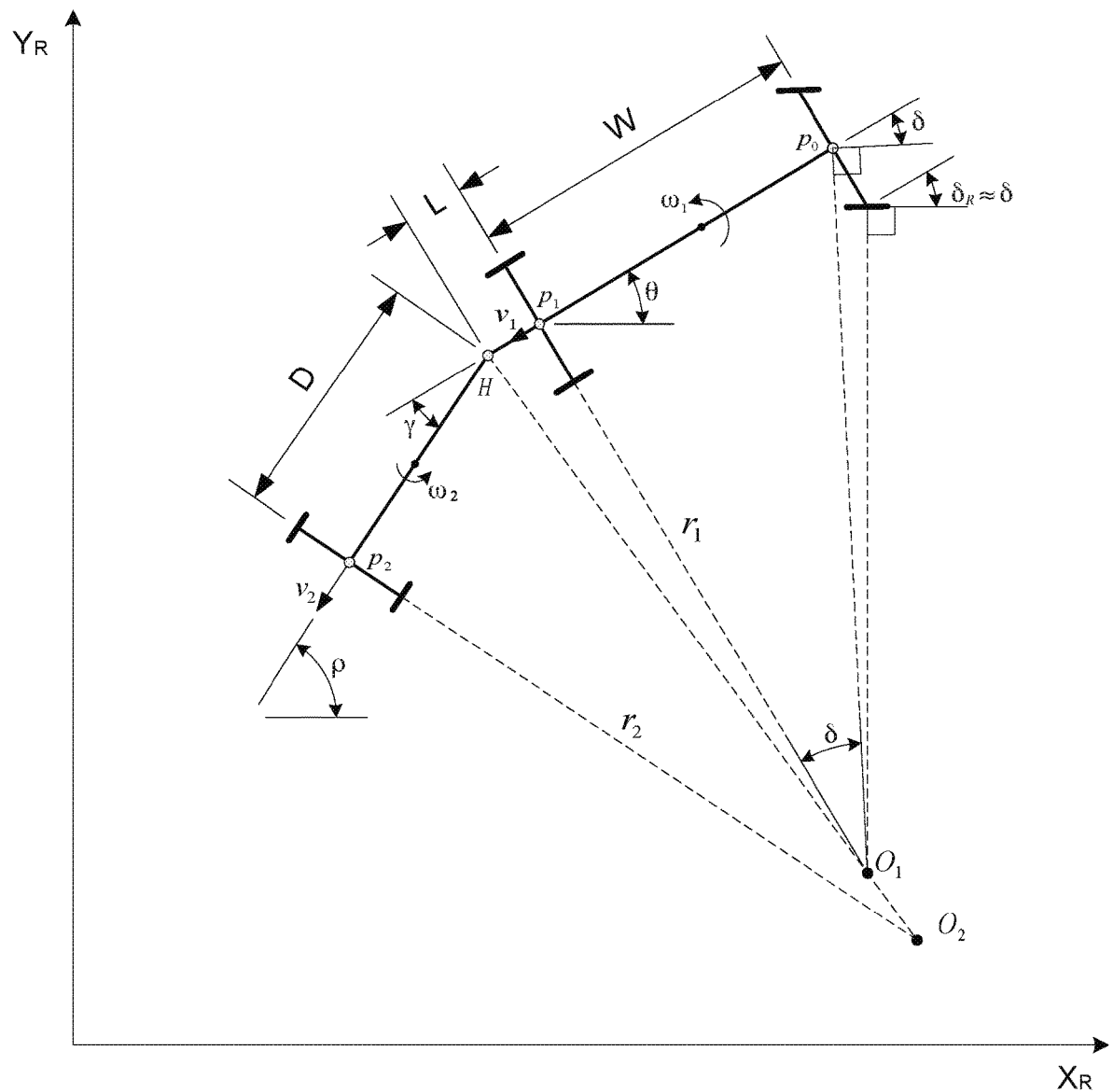
FIG. 3 is a schematic diagram that illustrates the geometry of a vehicle and a trailer overlaid with a two-dimensional x-y coordinate system, identifying variables used to determine a kinematic relationship of the vehicle and the trailer for the trailer backup assist system, according to one embodiment.

With reference to FIG. 3, we now turn to a discussion of vehicle and trailer information and parameters used to calculate a kinematic relationship between a curvature of a path of travel of the trailer 12 and the steering angle δ of the vehicle 14 towing the trailer 12, which can be desirable for a trailer backup assist system 10 configured in accordance with some embodiments, including for use by a curvature routine 98 of the controller 28 (FIG. 2) in one embodiment. To achieve such a kinematic relationship, certain assumptions may be made with regard to parameters associated with the vehicle 14 and trailer 12 combination. Examples of such assumptions include, but are not limited to, the trailer 12 being backed by the vehicle 14 at a relatively low speed, wheels 64 of the vehicle 14 and the trailer 12 having negligible (e.g., no) slip, tires of the vehicle 14 having negligible (e.g., no) lateral compliance, tires of the vehicle 14 and the trailer 12 having negligible (e.g., no) deformation, actuator dynamics of the vehicle 14 being negligible, and the vehicle 14 and the trailer 12 exhibiting negligible (e.g., no) roll or pitch motions, among other conceivable factors with the potential to have an effect on controlling the trailer 12 with the vehicle 14.

As shown in FIG. 3, for a system defined by a vehicle 14 and a trailer 12, a vehicle-trailer model of the kinematic relationship, as illustrated and described below, is based on various parameters associated with the vehicle 14 and the trailer 12. These parameters include:

δ: steering angle at steered front wheels 64 of the vehicle 14;
θ: yaw angle of the vehicle 14;
ρ: yaw angle of the trailer 12;
γ: hitch angle (γ=ρ−θ);
W: wheel base of the vehicle 14;
L: drawbar length between hitch point 42 and rear axle of the vehicle 14;
D: distance (trailer length) between hitch point 42 and axle of the trailer 12 or effective axle for a multiple axle trailer; and
$r_2$: curvature radius for the trailer 12.

One embodiment of a kinematic relationship between trailer path radius of curvature $r_2$ at the midpoint of an axle of the trailer 12, steering angle δ of the steered wheels 64 of the vehicle 14, and the hitch angle γ can be expressed in the equation provided below. As such, if the hitch angle γ is provided, the trailer path curvature $\kappa_2$ can be controlled based on regulating the steering angle δ (where $\dot{\rho}$ is trailer yaw rate and trailer velocity).

$$\kappa_2 = \frac{1}{r_2} = \frac{\dot{\rho}}{\dot{\eta}} = \frac{\left(W + \frac{Kv_1^2}{g}\right)\sin\gamma + L\cos\gamma\tan\delta}{D\left(\left(W + \frac{Kv_1^2}{g}\right)\cos\gamma - L\sin\gamma\tan\delta\right)} \quad (1)$$

This relationship can be expressed to provide the steering angle δ as a function of desired trailer path curvature $\kappa_2$ and hitch angle γ.

$$\delta = \tan^{-1}\left(\frac{\left(W + \frac{Kv_1^2}{g}\right)[\kappa_d D\cos\gamma - \sin\gamma]}{DL\kappa_d\sin\gamma + L\cos\gamma}\right) = F(\gamma, \kappa_d, K) \quad (2)$$

Accordingly, for a particular vehicle 14 and trailer 12 combination, certain parameters (e.g., D, W and L) of the kinematic relationship are constant and assumed known. $v_1$ is the vehicle longitudinal speed and g is the acceleration due to gravity. K is a speed dependent parameter which, when set to zero, makes the calculation of steering angle independent of vehicle speed. For example, vehicle-specific parameters of the kinematic relationship in the form of relevant dimensions can be predefined in an electronic control system of the vehicle 14 and trailer-specific parameters of the kinematic relationship can be inputted by a driver of the vehicle 14, determined from sensed trailer behavior in response to vehicle steering commands, or otherwise determined from signals provided by the trailer 12. Desired trailer path curvature $\kappa_2$ can be determined from the driver input via the steering input device 18. Through the use of the equation for providing steering angle $\delta$, a corresponding steering command can be generated by the curvature routine 98 for controlling the power assist steering system 62 of the vehicle 14.

In an additional embodiment, an assumption may be made by the curvature routine 98 that a longitudinal distance for the trailer drawbar length L between the pivoting connection and the rear axle of the vehicle 14 is equal to zero for purposes of operating the trailer backup assist system 10 when a gooseneck trailer or other similar trailer is connected with a hitch ball or a fifth wheel connector located over a rear axle of the vehicle 14. The assumption is essentially that the pivoting connection with the trailer 12 is substantially vertically aligned with the rear axle of the vehicle 14. When such an assumption is made, the controller 28 may generate the steering angle command for the vehicle 14 as a function independent of the longitudinal distance L between the pivoting connection and the rear axle of the vehicle 14. It is appreciated that the gooseneck trailer mentioned generally refers to the tongue 36 configuration being elevated to attach with the vehicle 14 at an elevated location over the rear axle, such as within a bed of a truck, whereby embodiments of the gooseneck trailer may include flatbed cargo areas, enclosed cargo areas, campers, cattle trailers, horse trailers, lowboy trailers, and other conceivable trailers with such a tongue 36 configuration.

Figure 4:
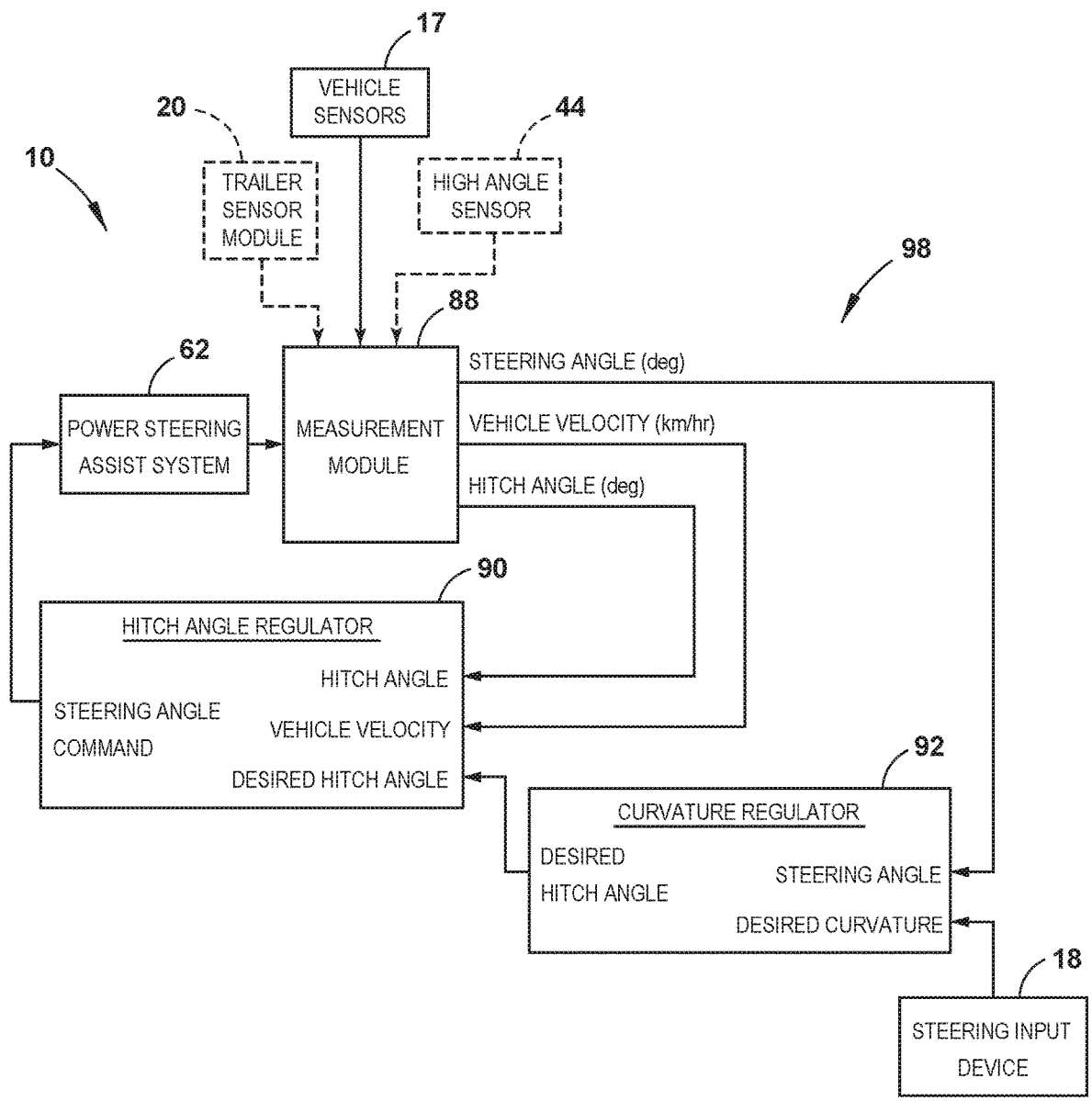
FIG. 4 is a schematic block diagram illustrating portions of a curvature controller, according to an additional embodiment, and other components of the trailer backup assist system, according to such an embodiment.

Yet another embodiment of the curvature routine 98 of the trailer backup assist system 10 is illustrated in FIG. 4, showing the general architectural layout whereby a measurement module 88, a hitch angle regulator 90, and a curvature regulator 92 are routines that may be stored in the memory 86 (FIG. 2) of the controller 28 (FIG. 2). In the illustrated layout, the steering input device 18 provides a desired curvature $\kappa_2$ value to the curvature regulator 92 of the controller 28, with the curvature regulator 92 and hitch angle regulator 90 working to bring the hitch angle $\gamma$ to a value corresponding with the desired curvature $\kappa_2$ within a portion of a resulting overall backing path 26 (FIG. 6) by controlling the steering angle $\delta$ of vehicle 14. The curvature regulator 92 computes a desired hitch angle $\gamma_{ref}$ based on the current desired curvature $\kappa_2$ along with the steering angle $\delta$ provided by a measurement module 88 in this embodiment of the controller 28. The measurement module 88 may be a memory device separate from or integrated with the controller 28 that stores data from sensors of the trailer backup assist system 10, such as the hitch angle sensor 44 and the vehicle sensors 17, or alternatively the measurement module 88 may otherwise directly transmit data from the sensors without functioning as a memory device. Once the desired hitch angle $\gamma_{ref}$ is computed by the curvature regulator 92, the hitch angle regulator 90 generates a steering angle command based on the computed desired hitch angle $\gamma_{ref}$ as well as a measured or otherwise estimated hitch angle $\gamma$ and a current velocity of the vehicle 14. The steering angle command is supplied to the power assist steering system 62 of the vehicle 14, with curvature routine 98 operating on a closed-loop basis to continuously account for the dynamics of the system 10 during operation. Accordingly, the curvature regulator 92 and the hitch angle regulator 90 continually process information from the measurement module 88 to provide accurate steering angle commands that place the trailer 12 on the desired curvature $\kappa_2$ and the desired backing path 26, without substantial overshoot or continuous oscillation of the path of travel about the desired curvature $\kappa_2$.

Specifically, entering the control system 10 is an input, $\kappa_2$, which represents the desired curvature of the trailer 12 that is provided to the curvature regulator 92. The curvature regulator 92 can be expressed as a static map, $p(\kappa_2, \delta)$, which in one embodiment is the following equation:

$$p(\kappa_2, \delta) = \tan^{-1}\left(\frac{\kappa_2 D + L\tan(\delta)}{\kappa_2 DL\tan(\delta) - W}\right) \quad (3)$$

The output hitch angle of $p(\kappa_2, \delta)$ is provided as the reference signal, $\gamma_{ref}$, for the remainder of the control system 10, although the steering angle $\delta$ value used by the curvature regulator 92 is feedback from the measurement module as a result of the non-linear function of the hitch angle regulator 90 for the steering angle command fed to power assist steering system 62 and the actual movement of steered wheels 64 achieved thereby. In the illustrated embodiment, the hitch angle regulator 90 uses feedback linearization for defining a feedback control law, as follows:

$$g(u, \gamma, v) = \delta = \tan^{-1}\left(\frac{W}{v\left(1 + \frac{L}{D}\cos(\gamma)\right)}\left(u - \frac{v}{D}\sin(\gamma)\right)\right) \quad (4)$$

The auxiliary variable u is the output from a proportional integral (PI) controller, whereby the integral portion substantially eliminates steady-state tracking error. More specifically, the control system 10 illustrated in FIG. 4 may be expressed as the following differential-algebraic equations:

$$\dot{\gamma}(t) = \frac{v(t)}{D}\sin(\gamma(t)) + \left(1 + \frac{L}{D}\cos(\gamma(t))\right)\frac{v(t)}{V}\bar{\delta} \quad (5)$$

$$\tan(\delta) = \bar{\delta} = \frac{W}{v(t)\left(1 + \frac{L}{D}\cos(\gamma(t))\right)}\left(K_P(p(\kappa_2, \delta) - \gamma(t)) - \frac{v(t)}{D}\sin(\gamma(t))\right) \quad (6)$$

It is contemplated that the PI controller may have gain terms based on trailer length D since shorter trailers will generally have faster dynamics. In addition, the hitch angle regulator 90 may be configured to prevent the desired hitch angle $\gamma_{ref}$ to reach or exceed a jackknife angle $\gamma_{jk}$, as computed by the controller 28 or otherwise determined by the trailer backup assist system 10, as disclosed in greater detail herein.

Figure 5:
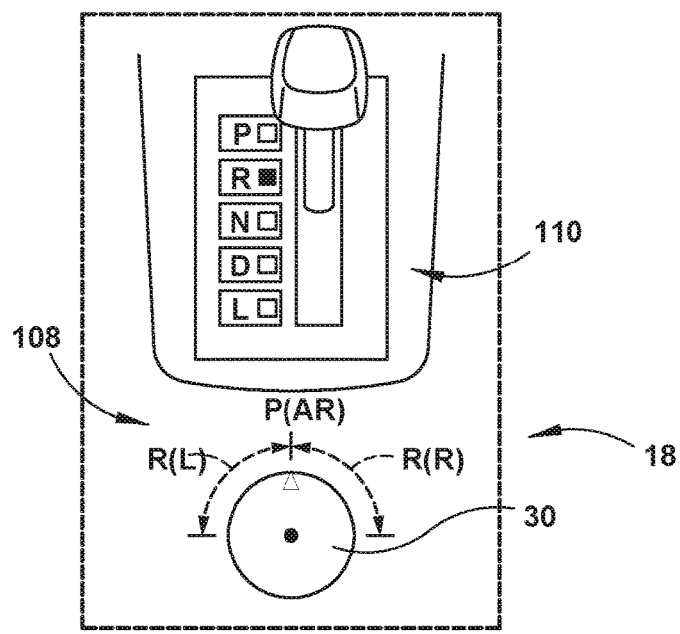
FIG. 5 is a plan view of a steering input device having a rotatable knob for operating the trailer backup assist system, according to one embodiment.

Referring now to FIG. 5, one embodiment of the steering input device 18 is illustrated disposed on a center console 108 of the vehicle 14 proximate a shifter 110. In this embodiment, the steering input device 18 includes a rotatable knob 30 for providing the controller 28 (FIG. 2) with the desired curvature $\kappa_2$ of the trailer 12. More specifically, the angular position of the rotatable knob 30 may correlate with a curvature input, such that rotation of the knob 30 to a different angular position provides a different commanded curvature $\kappa_2$ with an incremental change based on the amount of rotation and, in some embodiments, a normalized rate, as described in greater detail herein.

Figure 6:
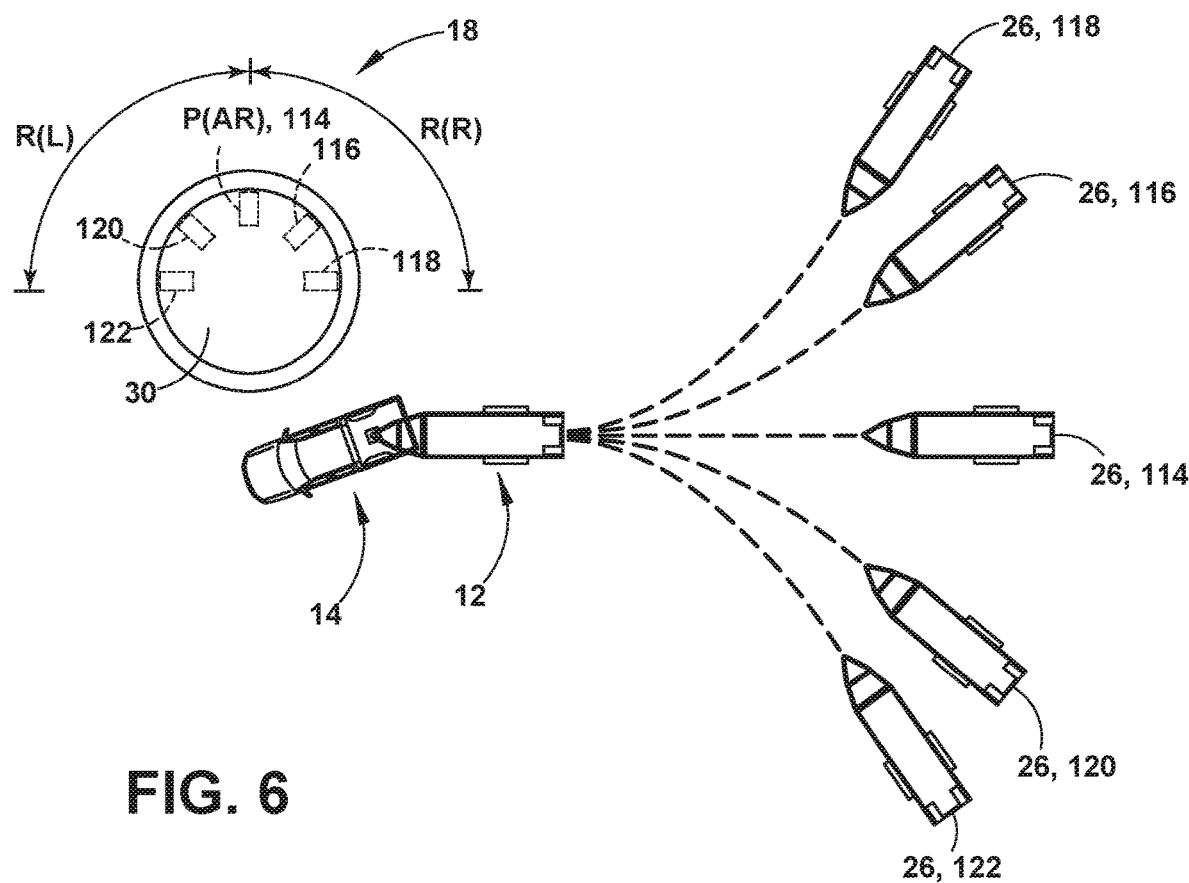
FIG. 6 is a plan view of another embodiment of a rotatable knob for selecting a desired curvature of a trailer and a corresponding schematic diagram illustrating a vehicle and a trailer with various trailer curvature paths correlating with desired curvatures that may be selected.

The rotatable knob 30, as illustrated in FIG. 5, may be biased (e.g., by a spring return) to a center, or at-rest position P(AR) between opposing rotational ranges of motion R(R), R(L). In the illustrated embodiment, a first one of the opposing rotational ranges of motion R(R) is substantially equal to a second one R(L) of the opposing rotational ranges of motion R(L), R(R). To provide a tactile indication of an amount of rotation of the rotatable knob 30, a torque that biases the knob 30 toward the at-rest position P(AR) can increase (e.g., non-linearly) as a function of the amount of rotation of the rotatable knob 30 with respect to the at-rest position P(AR). Additionally, the rotatable knob 30 can be configured with position indicating detents such that the driver can positively feel the at-rest position P(AR) and feel the ends of the opposing rotational ranges of motion R(L), R(R) approaching (e.g., soft end stops). The rotatable knob 30 may generate a desired curvature $\kappa_2$ value as a function of an amount of rotation of the rotatable knob 30 with respect to the at-rest position P(AR) and a direction of movement of the rotatable knob 30 with respect to the at-rest position P(AR), which itself may correspond to a zero-curvature command. As shown in FIG. 6, it is also contemplated that the rotation of the rotatable knob 30 may also be used to determine the desired curvature $\kappa_2$ output to the controller 28. The at-rest position P(AR), 114 of the knob 30 corresponds to a signal indicating that the vehicle 14 should be steered such that the trailer 12 is backed along a substantially straight backing path 26 (as indicated by the numbering of the position 114 of knob 30 corresponding with the particular path 26 achieved and corresponding therewith) corresponding with a zero trailer curvature request from the driver), as defined by the longitudinal axis of the trailer 12 when the knob 30 was returned to the at-rest position P(AR). A maximum clockwise and anti-clockwise position of the knob 30 (i.e., limits of the opposing rotational ranges of motion R(R), R(L) in FIG. 5) may each correspond to a respective signal indicating a maximum allowed curvature $\kappa_{max}$ (i.e., most acute trajectory or smallest radius of curvature) of a path of travel of the trailer 12 that is allowed by the controller 28, chosen to be less than the limiting curvature $\kappa_{lim}$ corresponding to a jackknife condition.

Figure 7:
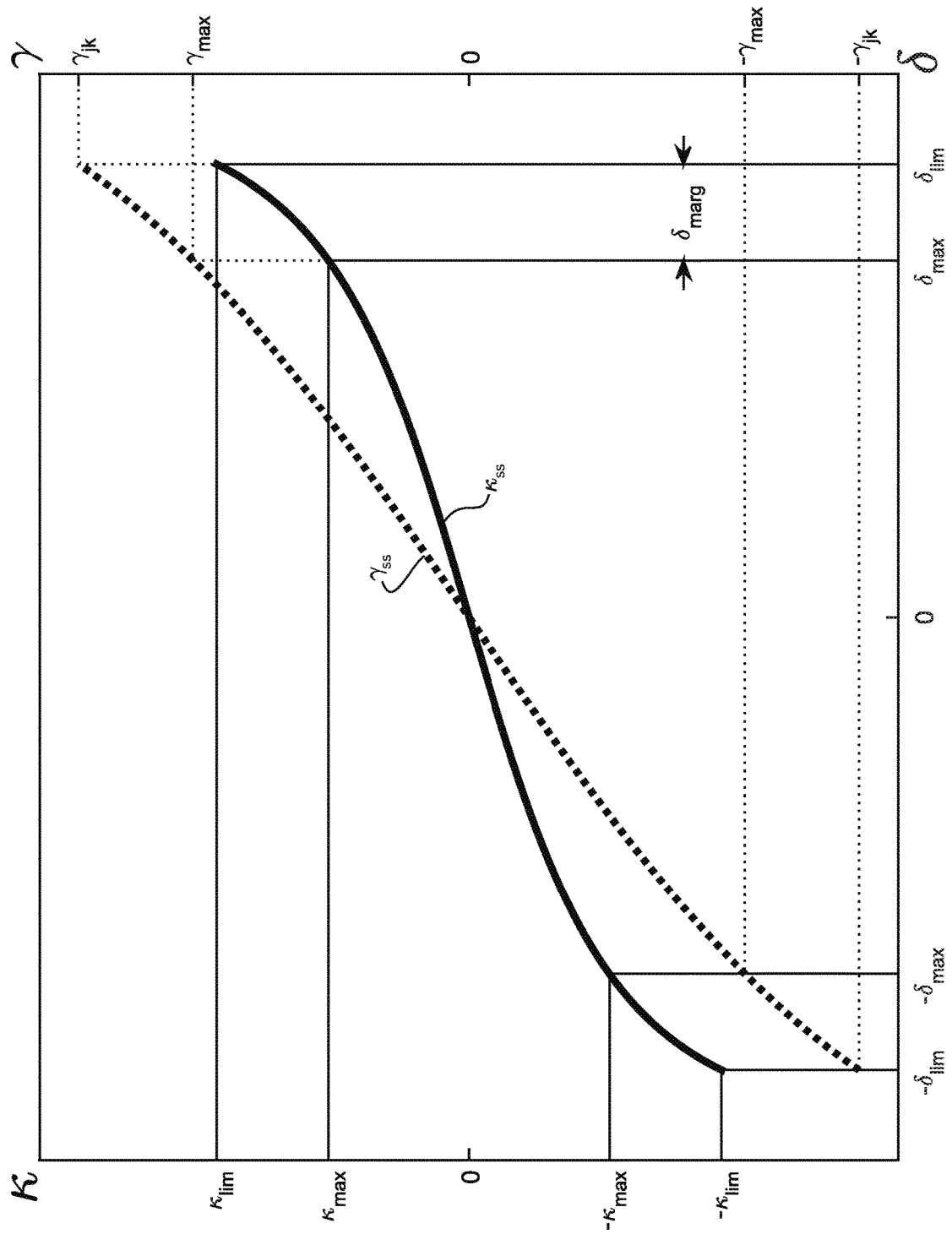
FIG. 7 is a graphical representation of a steady-state relationship between a vehicle steering angle and a resulting trailer curvature and hitch angle.

FIG. 7 illustrates an example of the steady-state relationships (which depend on the trailer length D and the hitch position L) between steering angle δ, trailer curvature $\kappa_2$, and hitch angle γ. The steering system imposes a physical limit on the maximum steering angle, denoted $\delta_{lim}$. The trailer curvature corresponding to a steering wheel angle $\delta_{lim}$ is denoted $\kappa_{lim}$, while the corresponding hitch angle is the jackknife angle $\gamma_{jk}$. If the hitch angle γ reaches or exceeds the jackknife angle $\gamma_{jk}$, the steering system will subsequently not be able to countersteer as required in order to reduce the hitch angle γ while continuing to reverse the trailer. Furthermore, the closer the hitch angle γ is to the jackknife angle $\gamma_{jk}$, the greater will be the backing distance required to reduce or zero the hitch angle. Therefore, the system 10 may limit the desired curvature $\kappa_d$ to an interval $[-\kappa_{max}, \kappa_{max}]$, where $0<\kappa_{max}<\kappa_{lim}$. The maximum allowed curvature $\kappa_{max}$ may be chosen so as to satisfy certain performance objectives, as described below.

Returning to FIG. 6, a driver can turn the rotatable knob 30 to provide a desired curvature $\kappa_2$, within the available ranges of directional positions, while the driver of the vehicle 14 backs the trailer 12. In the illustrated embodiment, the rotatable knob 30 rotates about a central axis between a center or middle position 114 corresponding to a substantially straight backing path 26 of travel (i.e. zero curvature), as defined by the longitudinal axis of the trailer 12, and various rotated positions 116, 118, 120, 122 on opposing sides of the middle position 114, commanding a desired curvature $\kappa_2$ (which may be referred to as the "curvature command") corresponding to a radius of the desired backing path 26 of travel for the trailer 12 at the corresponding one of the commanded rotated positions 116, 118, 120, 122. It is contemplated that the rotatable knob 30 may be configured in accordance with embodiments of the disclosed subject matter and omit a means for being biased to an at-rest position P(AR) between opposing rotational ranges of motion. Lack of such biasing may allow a current rotational position of the rotatable knob 30 to be maintained until the rotational control input device is manually moved to a different position.

Figure 8:
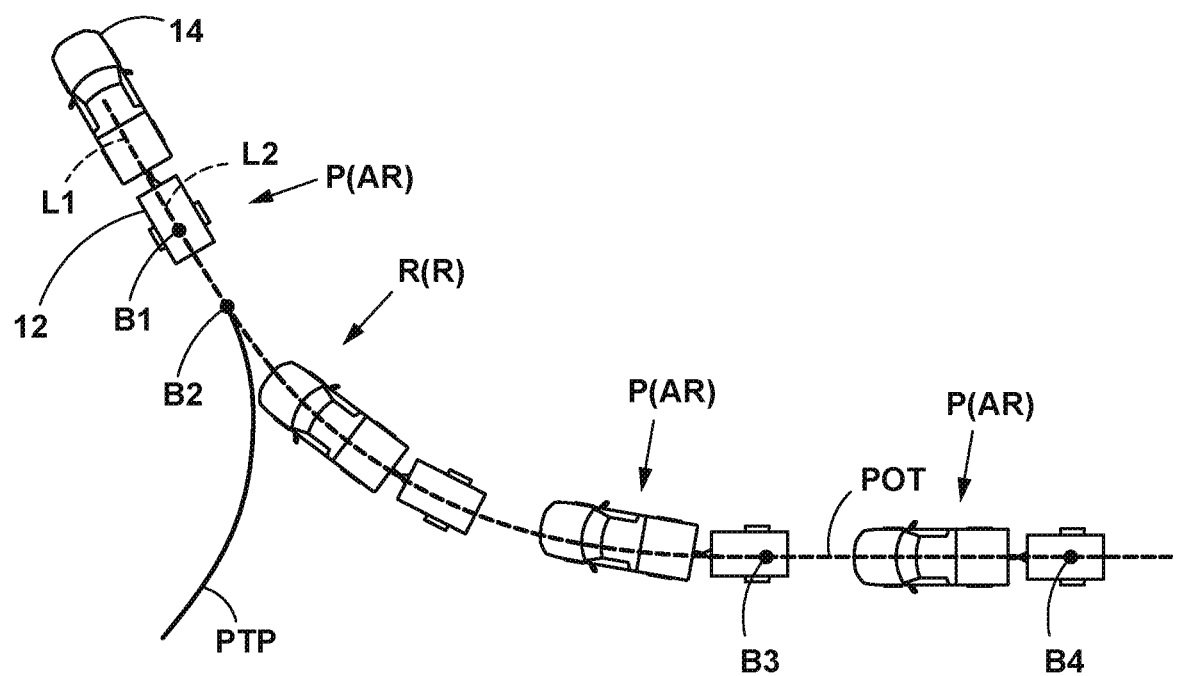
FIG. 8 is a schematic diagram showing a backup sequence of a vehicle and a trailer implementing various sequential curvature selections with the trailer backup assist system, according to one embodiment.

Referring to FIG. 8, an example of using the steering input device 18 (FIG. 5) for dictating a curvature $\kappa_2$ of a desired backing path 26 (FIG. 6) of travel (POT), or portion thereof, of the trailer 12 while backing up the trailer 12 with the vehicle 14 is shown. In preparation of backing the trailer 12, the driver of the vehicle 14 may drive the vehicle 14 forward along a pull-thru path (PTP) to position the vehicle 14 and trailer 12 at a first backup position B1. In the first backup position B1, the vehicle 14 and trailer 12 are longitudinally aligned with each other such that a longitudinal centerline axis L1 of the vehicle 14 is aligned with (e.g., parallel with or coincidental with) a longitudinal centerline axis L2 of the trailer 12. It is disclosed herein that such alignment of the longitudinal axes L1, L2 at the onset of an instance of trailer backup functionality is not a requirement for operability of a trailer backup assist system 10, but may be done for calibration.

After activating the trailer backup assist system 10 (e.g., before, after, or during the pull-thru sequence), the driver begins to back the trailer 12 by reversing the vehicle 14 from the first backup position B1. So long as the rotatable knob 30 (FIG. 5) of the trailer backup steering input device 18 (FIG. 5) remains in the at-rest position P(AR) and no other steering input devices 18 are activated, the trailer backup assist system 10 will steer the vehicle 14 as necessary for causing the trailer 12 to be backed along a substantially straight path of travel, as defined by the longitudinal direction of the trailer 12, specifically the centerline axis L2 of the trailer 12, at the time when backing of the trailer 12 began. When the trailer 12 reaches the second backup position B2, the driver rotates the rotatable knob 30 to command the trailer 12 to be steered to the right (i.e., a knob position R(R) clockwise rotation). Accordingly, the trailer backup assist system 10 will steer the vehicle 14 as necessary for causing the trailer 12 to be steered to the right as a function of an amount of rotation of the rotatable knob 30 with respect to the at-rest position P(AR), a rate movement of the knob 30, and/or a direction of movement of the knob 30 with respect to the at-rest position P(AR). Similarly, the trailer 12 can be commanded to steer to the left by rotating the rotatable knob 30 to the left. When the trailer 12 reaches backup position B3, the driver allows the rotatable knob 30 to return to the at-rest position P(AR) thereby causing the trailer backup assist system 10 to steer the vehicle 14 as necessary for causing the trailer 12 to be backed along a substantially straight path of travel as defined by the longitudinal centerline axis L2 of the trailer 12 at the time when the rotatable knob 30 was returned to the at-rest position P(AR). Thereafter, the trailer backup assist system 10 steers the vehicle 14 as necessary to cause the trailer 12 to be backed along this substantially straight path to the fourth backup position B4. In this regard, arcuate portions of a path of travel POT of the trailer 12 are dictated by rotation of the rotatable knob 30 and straight portions of the path of travel POT are dictated by an orientation of the centerline longitudinal axis L2 of the trailer 12 when the knob 30 is in/returned to the at-rest position P(AR).

In the embodiment illustrated in FIG. 8, in order to activate the trailer backup assist system 10, the driver interacts with the trailer backup assist system 10 and the system 10 automatically steers as the driver reverses the vehicle 14. As discussed above, the driver may command the trailer backing path by using a steering input device 18 and the controller 28 may determine the vehicle steering angle $\delta$ to achieve the desired curvature $\kappa_2$, while the driver controls the throttle and brake.

Referring now to FIG. 9, a schematic view of a vehicle 14 reversing a trailer 12 is shown during attempted straight backing according to a curvature command $\kappa$ of zero $\kappa_{2,0}$ an a ground surface G having a slope S at least partially transverse to the resulting desired backing path $26_d$, which is a straight backing path, as shown. As discussed above, the feedback control law of equations (5) and (6) and implemented by the curvature routine 98 illustrated in FIG. 4 assumes zero slip at any of the pairs of wheels in either trailer 12 or vehicle 14, including in steered wheels 64 or rear wheels 65 of vehicle 14 or in wheels 67 of trailer 12. In this manner, any slip that occurs in one or more of the sets of wheels 64, 65, 67 can negatively affect the performance of system 10 in maintaining trailer 12 along the backing path 26 at the desired curvature $\kappa$. In a similar manner it is noted that other "noise factors" or irregularities, including hitch lash or an error in hitch angle $\gamma$ measurement, can similarly affect system 10 performance. In particular, hitch lash refers to the hitch point 42 between trailer 12 and vehicle 14 being off-center, which may introduce a small hitch angle $\gamma$ when a hitch angle sensor 44 (particularly, one using imaging to track the position of target 52—FIG. 1) senses a zero hitch angle y. In a similar manner, in an embodiment wherein system 10 uses an alternative sensor to estimate hitch angle y, such as trailer yaw rate $\omega_2$ sensor 25, an error in such estimation, caused by any number of factors, may aggregate over time to lead to unpredicted behavior. In general, the effect of such noise factors is most realized by a user during straight backing, as depicted, where the expected behavior of system 10 is most easily quantified by the user, or during backing at a maximum curvature $\kappa_{max}$, when the consequences of a deviation from desired performance have the most significant consequence (i.e., deactivation of system 10).

In the example illustrated in FIG. 10, vehicle 14 and trailer 12, coupled about hitch point 42, are positioned along a straight path $26_d$ on ground surface G with a slope S transverse to straight backing path $26_d$. When backing is carried out using system 10 with a zero curvature input $\kappa_{2,0}$ that corresponds with the desired straight backing path $26_d$, the slope S beneath vehicle 14 will allow gravity to cause at least the trailer wheels 67 to slip down the slope S and away from the desired straight backing path $26_d$. Not only can this cause movement of trailer along a slope angle $\sigma_2$ down the slope S, but, absent compensation by system 10, can cause trailer 12 to rotate away from the hitch angle $\gamma$ called for by curvature routine 98 based on the desired curvature (which in the example of straight backing is zero). In particular, such increasing hitch angle $\gamma$ may occur when trailer wheels 67 slip more than vehicle wheels 64,65, and may result, for example, in system 10, when lacking compensation, steering vehicle 14 to re-zero the hitch angle $\gamma$ and, accordingly, simply following trailer along the resulting path $26_s$. As shown in FIG. 10, straight backing of trailer 12 may require vehicle 14 to steer to maintain trailer 12 at an unknown hitch angle $\gamma$ to oppose movement of trailer 12 along angle $\sigma_2$ due to trailer wheel 67 slip. Even further, the rear vehicle wheels 65 and steered wheels 64 may also slip, by greater or lesser amounts causing rear wheels 65 to move along an angle $\sigma_1$ and steered wheels 64 to move along a different angle $\sigma_0$, such movement causing vehicle 14 to rotate as it also tries to move along the desired straight path $26_s$. In this manner, additional compensation is needed for movement of wheels 64 and 65 along the respective angles $\sigma_0$ and $\sigma_1$ to not only achieve movement of vehicle along the desired path $26_d$ but to maintain the needed hitch angle $\gamma$ to move trailer 12 in the direction of path $26d$. Because the general system 10 described above tends to seek a zero hitch angle $\gamma$ in response to a zero curvature command $\kappa_{2,0}$, controller 28, lacking appropriate compensation, will not arrive at the needed hitch angle $\gamma$.

Figure 11:
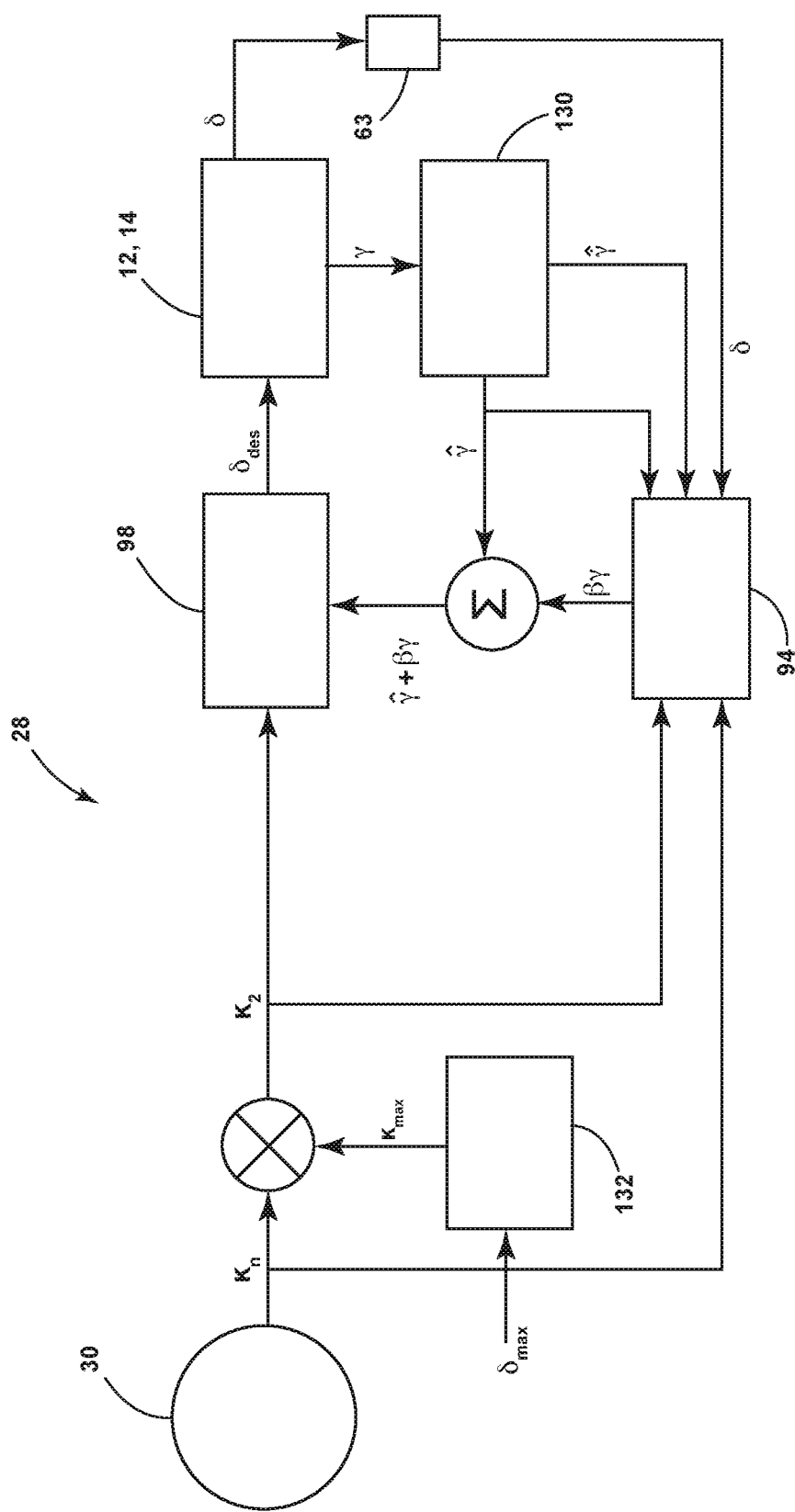
FIG. 11 is a schematic diagram of a controller employing a compensator applied to a control parameter to compensate for errors dynamically affecting the performance maintaining a trailer on a desired backing path.

Accordingly, as shown in FIG. 11, system 10 may employ a compensator 94 to arrive at the hitch angle $\gamma$ needed to maintain backing of trailer 12 in the direction of desired backing path $26_d$, which is effectively along an adjusted path $26_{adj}$ (FIG. 10) that is offset from path $26_d$ but tracks in the desired direction thereof. In general, this is done by characterizing the hitch angle $\gamma$ needed for backing trailer 12 along adjusted straight path $26_{adj}$ as an offset $\gamma_o$ from the zero hitch angle $\gamma$ that system 10 would arrive at under normal circumstances. In this manner, the controller 28 depicted in FIG. 11 dynamically determines the needed hitch angle offset $\gamma_o$ by applying an adaptive law based on a desired kinematic characteristic of the vehicle 14 and trailer 12 combination known to be related to straight backing. As mentioned above, controller 28, by way of compensator 94, takes a measurement of such a characteristic and adjusts the hitch angle offset $\gamma_o$ in the depicted, closed-loop scheme based on the measurement.

To apply the above-described offset $\gamma_o$ to the control law implemented by curvature routine 98 (and set forth above in equation (2)), the hitch angle offset $\gamma_o$, determined by compensator 94, as described further below, is subtracted from the estimated hitch angle $\hat{\gamma}$ (which can be obtained using hitch angle sensor 44 or using information from trailer yaw rate sensor 25 and/or vehicle yaw rate sensor 60 in hitch angle estimation routine 130), and the resulting difference $\hat{\gamma} - \gamma_o$ is fed into curvature routine 98, resulting in the modified equation:

$$\delta = \tan^{-1}\left(\frac{\left(W + \frac{Kv_1^2}{g}\right)[\kappa_d D\cos(\hat{\gamma} - \gamma_o) - \sin(\hat{\gamma} - \gamma_o)]}{DL\kappa_d \sin(\hat{\gamma} - \gamma_o) + L\cos(\hat{\gamma} - \gamma_o)}\right) = F(\hat{\gamma} - \gamma_o, \kappa_d, K). \quad (7)$$

The hitch angle offset $\gamma_o$ is determined using an adaptive law in compensator 94 that is derived based on a known characteristic of straight backing, namely that, during straight backing: 1) vehicle 14 should not be rotating; 2) trailer 12 should not rotate; and, 3) the steering angle $\delta$ should be zero. These characteristics represent predicted behaviors of the relevant kinematic characteristics of the vehicle 14 and trailer 12 combination under a zero curvature command $\kappa_{2,0}$ (such that controller 28 seeks to maintain the vehicle 14 and trailer 12 combination along straight backing path $26_d$). Namely, it is predicted under a zero curvature command $\kappa_{2,0}$, the trailer yaw rate $\omega_2$, the vehicle yaw rate $\omega_1$, and the steering angle $\delta$ should all be zero. In this manner, compensator 94 uses a deviation from the predicted behavior of one of the characteristics, amounting to a desired zero value thereof, to arrive at the hitch angle offset $\gamma_o$ that results in straight backing.

In accordance with the present disclosure, any one of the listed straight backing characteristics, alone, can be used to derive an adaptive law useable in compensator 94 in a variation of system 10, wherein a measurement for the relevant characteristic (vehicle yaw rate $\omega_1$, trailer yaw rater $\omega_2$, and steering angle $\delta$, respectively) is taken and is available to controller 28. In the case of characteristic (1), that the vehicle yaw rate $\omega_1$ is zero, the observation is written as $\omega_1=0$ or $\int\omega_1 dt=0$. As discussed above, the backing of vehicle 14 on slope S can cause rotation of vehicle 14 due to a difference in sliding angles $\sigma_0$ and $\sigma_1$ between the steered wheels 64 and the rear wheels 65, indicating that straight backing is not being achieved. In this manner, the compensator 94 can let the hitch angle offset $\gamma_o$ be proportional to the integral of the vehicle yaw rate $\omega_1$ (i.e., the change in vehicle yaw angle $\theta$), which yields the equation:

$$\gamma_o(t)=k_i\int_0^t \omega_1(\tau)d\tau. \tag{8}$$

In this manner, a variation of controller 28, as depicted in FIG. 11, using an integrator according to equation (8) to determine the hitch angle offset $\gamma_o$ in compensator 94, can activate the integrator included in compensator 94 during a zero curvature command $\kappa_{2,0}$. In this manner, as illustrated, compensator 94 takes the curvature command $\kappa2$ as an input to determine if the curvature command $\kappa_2$ corresponds with straight backing (i.e., is a zero curvature command $\kappa_{2,0}$ or is within a small, predetermined range, such as +/−0.01 $\kappa_{max}$, of zero). Similarly, compensator 94 can also take the measured or estimated hitch angle $\hat{\gamma}$ as an input to determine if the hitch angle $\gamma$ is sufficiently close to zero to work to maintain a zero hitch angle $\gamma$ through determination of the hitch angle offset $\gamma_o$. When these conditions have been met, compensator 94 activates the integrator and takes the characteristic measurement, vehicle yaw rate $\omega_1$ in the present instance, and feeds out the value for offset $\gamma_o$, as the integrator accumulates.

As shown, the value for the offset $\gamma_o$ is subtracted from the measured or estimated hitch angle value $\hat{\gamma}$ and fed into curvature routine 98, as discussed above, which outputs the desired steering angle $\delta_{des}$ as a signal, such signal being received by the steering system 62 within vehicle 14, which controls the steered wheels 64 (either directly or by controlling the steering wheel angle by way of EPAS 62 to turn steered wheels 64) to arrive at the desired steering angle $\delta$. Presently, the resulting steering angle $\delta$ should work to reduce the vehicle yaw rate $\omega_1$, which is continued to be measured and fed to compensator 94 so long as the commanded curvature $\kappa_2$ is zero or sufficiently close to zero. Accordingly, controller 28 works to zero the vehicle yaw rate $\omega_1$ by continuing to accumulate the integrator based on vehicle yaw rate $\omega_1$ and, accordingly, to increase the hitch angle offset $\gamma_o$ until a zero vehicle yaw rate $\omega_1$ is achieved. By using the integrator to achieve a trailer offset angle $\gamma_o$ in the closed-loop manner depicted in FIG. 11, the hitch angle offset $\gamma_o$ will increase (or decrease) so long as the vehicle yaw rate $\omega_1$ is non-zero. As discussed above, if trailer 12 is moving on a slip-induced path $26_s$ that is not straight, system 10 will track toward the position of trailer 12 along path $26_s$ in an attempt to zero the value of the sum of the hitch angle $\gamma$ and the present hitch angle offset $\gamma_o$. This causes rotation of vehicle 14, increasing the output of the integrator until the correct hitch angle offset $\gamma_o$ is determined. At such a point, the value for the integrator remains constant (assuming no disturbances) and the arrived-at steering angle $\delta$ is maintained.

It is noted that it may be desirable to choose the gain $K_i$ of the integrator in equation (8) as a function of various factors, including trailer length D. Accordingly, $K_i$ can be set to a value determined by known means to be sufficient for use in the particular implementation of system 10. As trailer length D is initially known or arrived at by system 10 during operation (by way of estimation routine 130, for example), the gain $K_i$ can be proportional to trailer length D, for example, by including values for $K_i$ in a lookup table or by an appropriate equation, populated or determined empirically. In this manner, a reasonable value for $K_i$ can be used to achieve acceptable system performance.

An alternative integrator can be derived based on characteristic (2) above in which the trailer yaw $\rho$ is used to determine the hitch angle offset $\gamma_o$, according to a linear function of the integral of the trailer yaw rate $\omega_2$ according to the equation:

$$\gamma_o(t)=k_i\int_0^t \omega_2(\tau)d\tau. \tag{9}$$

The use of this integrator is carried out in a manner similar to that which is described above. In particular, compensator 94 can activate the integrator when the commanded curvature $\kappa_2$ is determined to be zero or sufficiently close to zero with the output hitch angle offset $\gamma_o$ increasing proportionately so long as trailer yaw rate $\omega_2$ is non-zero such that the correct hitch angle offset $\gamma_o$ is reached. At such a point straight backing of trailer 12 along adjusted path $26_{adj}$ is achieved. The value of gain $K_i$ can be set or determined based on the principles discussed above with respect to the use of equation (8).

As a further alternative, characteristic (3) above, in which the steering angle $\delta$ is to be zero, can be used to derive an integrator that can be used by compensator 94. In this manner, the steering angle $\delta$ can be used to derive the hitch angle offset $\gamma_o$ given that the vehicle yaw rate $\omega_1$ is related to the vehicle velocity $v_1$ and the steering angle $\delta$ by the equation:

$$\omega_1 = \frac{v_1 \tan\delta}{W}, \tag{10}$$

under conditions in which no wheel slip is present. Accordingly, the zero steering angle $\delta$ condition is equivalent to: $\int v_1 \tan(\delta)/W dt=0$, which can be simplified as: $\int v_1 \delta dt=0$. In this manner, a compensator 94 determining the hitch angle offset $\gamma_o$ as proportional to the integral of the steered wheel angle $\delta$ using the equation:

$$\gamma_o(t)=k_i\int_0^t v_1(\tau)\delta(\tau)d\tau \tag{11}$$

is nearly equivalent to the use of equation (8), as described above. It is noted that slip of the vehicle wheels (64,65) may result in a slightly different instantaneous hitch angle offset $\gamma_o$, as the base equation (10) does not hold when wheel slip is present. However, such inaccuracies may not prevent system 10 using controller 28 and compensator 94 from improving straight backing performance over a non-compensated system, and the hitch angle offset $\gamma_o$ determined using (11) will likely converge to a value very close to that which would be obtained using (8). Further, as the steering angle $\delta$ can be measured directly, rather than relying on gyros or the like (such as for the determination of vehicle yaw rate $\omega_1$ or trailer yaw rate $\omega_2$) the measurement of steering angle $\delta$ may be more accurate than the measurements of vehicle yaw rate $\omega_1$ and trailer yaw rate $\omega_2$ such that inaccuracies due to the presence of slope S may not result in comparatively worse performance when using equation (11) or an equivalent compared to equations (8) or (9), noting that absent wheel slip (e.g., when a trailer offset $\gamma_o$ is needed to compensate for trailer lash), performance using equation (11) or the like may be better.

While the determination and use of the hitch angle offset $\gamma_o$ is described above as being used to compensate for slip, particularly of trailer wheels 67, to achieve straight backing on a ground surface G exhibiting slope S, the controller 28 depicted in FIG. 11 and using any of the compensation schemes discussed above can also compensate for the additional noise factors discussed above. In particular, while the presence of slope S may require an actual nonzero hitch angle $\gamma$, induced in system 10 by the inclusion of hitch angle offset $\gamma_o$, hitch lash (or other imperfections in the geometry or construction of trailer 12) or hitch angle $\gamma$ measurement or estimation errors may utilize the hitch angle offset $\gamma_o$ determined by compensator 94 to bring the actual hitch angle $\gamma$ to zero when desired for straight backing on ground surface G when no slope S is present. In this manner, compensator 94 can be useful to improve backing of trailer 12 along backing path 26 having a zero curvature $\kappa_{2,0}$ regardless of, and without determining, any particular factor interfering with straight backing.

In any of the implementations discussed above, the hitch angle offset $\gamma_o$ determined by compensator 94 during straight backing (i.e., determined by activating the integrator when the commanded curvature $\kappa_2$ is zero or sufficiently close thereto) may only apply to straight backing. Further, continued closed-loop use of compensator 94 according to the above-described scheme cannot be used during backing along a path 26 for which the curvature $\kappa$ is non-zero because the integrators discussed above cause compensator 94 to adjust the actual hitch angle $\gamma$ to achieve straight backing. In this manner, when compensator 94 receives a non-zero input for the commanded curvature $\kappa_2$, the integrator is stopped. It is noted, however, that the noise factor or factors leading to the determination of a non-zero hitch angle offset $\gamma_o$ during straight backing may also adversely affect system performance during non-straight backing. As mentioned above, determination of a hitch angle offset $\gamma_o$ may also improve system 10 performance during backing along a path 26 having a maximum allowable curvature $\kappa_{max}$. One implementation of such a system is described in co-pending, commonly-assigned U.S. Patent App. No. 15/692,569 ("the '569 Application"), the entire disclosure of which is incorporated herein.

In particular, one variation of the system 10 described therein uses a controller generally similar to the controller 28 depicted herein in FIG. 11, including the use of a compensator that can be incorporated in a similar manner to compensator 94 described herein and can take the estimated hitch angle rate $\dot{\gamma}$ and steering angle $\delta$ as inputs to determine a hitch angle offset $\gamma_o$ subtracted from the measured or estimated hitch angle $\gamma$ fed into curvature routine 98. In the embodiment described in the '555 application, the compensator 94 is activated when the curvature command $\kappa_2$ is near a maximum curvature $\kappa_{2,max}$ for system 10 determined based on various parameters including the maximum steering angle $\delta_{max}$ and the trailer length D, as discussed above, to maintain the hitch angle $\gamma$ below a jackknife angle $\gamma_{jk}$ while maintaining a margin in the steering angle $\delta_{marg}$ sufficient to return the hitch angle $\gamma$ to zero when a zero curvature command $\kappa_{2,0}$ is subsequently requested. In this manner, the hitch angle offset $\gamma_o$ is arrived at to compensate for errors in one or more input or estimated parameters (such as trailer length D and hitch position L) or measurements (such as hitch angle $\gamma$) that may cause the actual hitch angle $\gamma$ and steering angle $\delta$ to converge to different angles from what may be expected as, or determined to be, the steady-state values thereof, based on the parameters and measurements.

Such a scheme can be implemented by the present controller 28, as illustrated in FIG. 11 by adding an appropriate routine to compensator 94 that activates when the commanded curvature $\kappa_2$ is at the maximum value $\kappa_{2,max}$ for either the left R(L) or right R(R) (FIG. 5) ranges of motion for knob 30 and a steady state (i.e., $\dot{\gamma}\approx$zero) condition is detected. Compensator 94 then takes the steering angle $\delta$ as an input and calculates the hitch angle offset $\gamma_o$ as a function of an error between the actual measured steering angle $\delta$ and a predicted steering angle $\delta_{pred}$ for the given curvature $\kappa_{2,max}$ in light of the input or estimated values for trailer length D and hitch offset given L. In this manner, compensator 94 can improve performance when a factor contributing to a steady-state error is an unknown bias or scale factor in the hitch angle sensor 44 or estimation routine 130 (and related sensors 25,60—FIG. 2). Even further, such a compensator 94 can also improve the ability of system 10 to reduce the hitch angle $\gamma$ after a maximum commanded curvature $\kappa_{2,max}$ to compensate for other errors, such as in the entered or estimated kinematic parameters (including trailer length D and hitch offset L).

It is also noted that controller 28 can compute a steady state hitch angle $\delta_{max}$ associated with the desired steering angle margin $\delta_{marg}$. This is the hitch angle at which the nominal controller of equation (2) would command a steering angle $\delta_{max}$, leaving a steering angle margin of $\delta_{marg}$. When the maximum curvature compensation scheme has determined values for the hitch angle offset $\gamma_o$ at the maximum curvature commands $\kappa_{2,max}$ associated respectively with the left R(L) and right R(R) ranges of motion, respectively denoted as $\gamma_{o,L}$ and $\gamma_{o,R}$, compensator 94 can use the hitch angle offset $\gamma_o$ for straight backing obtained above and denoted as $\gamma_{o,S}$ with the hitch angle offsets $\gamma_{o,R}$ and $\gamma_{o,L}$ to correct hitch angle $\gamma$ measurements (or compensate for other errors affecting hitch angle $\gamma$) not only during backing under a zero curvature command $\kappa_{2,0}$ or under a maximum curvature command $\kappa_{2,max}$, but also across the entire range of hitch angles. This can be done using an interpolating hitch angle measurement error model, wherein the control law in equation (7) uses the hitch angle offset $\gamma_o$ computed as:

$$\gamma_o(\gamma) = \begin{cases} \gamma_{o,S} + \dfrac{\gamma_{o,R} - \gamma_{o,S}}{\gamma_{max} + \gamma_{o,R} - \gamma_{o,S}}(\gamma - \gamma_{o,S}), & \text{when } \gamma \geq \gamma_{o,S} \\ \gamma_{o,S} + \dfrac{\gamma_{o,S} - \gamma_{o,L}}{\gamma_{max} + \gamma_{o,S} - \gamma_{o,L}}(\gamma - \gamma_{o,S}), & \text{when } \gamma < \gamma_{o,S} \end{cases} \quad (12)$$

such that the hitch angle offset $\gamma_o$ is a function of the instantaneous measured hitch angle $\gamma$. In this manner, the compensator 94, as depicted in FIG. 11, in the present embodiment can include integrators and update laws for the straight backing hitch angle offset $\gamma_{o,S}$ and the left and right maximum hitch angle offsets $\gamma_{o,L}$ and $\gamma_{o,R}$, as well as the interpolation function of equation (12). It is noted that function (12) is one example of a useable interpolation function and that other interpolation functions, such as parabolic or spline functions, can be used for the same purpose. It is further noted, that the function may update as the value for the straight backing hitch angle offset $\gamma_{o,S}$ changes due to, for example, a change in the slope S of the ground surface G affecting straight backing performance of system 10. In one aspect, the use of the steering angle $\delta$ as an input to compensator 94 for determining the straight backing hitch angle offset $\gamma_{o,S}$ may simplify the use of such a compensator 94, as the same measurement is used to determine the hitch angle offsets $\gamma_{o,L}$, $\gamma_{o,R}$, and $\gamma_{o,S}$, which may also result in more accurate or consistent interpolation. It is noted however, that other embodiments can use vehicle yaw rate $\omega_1$ or trailer yaw rate $\omega_2$, as discussed above, to determine the straight backing hitch angle offset $\gamma_{o,S}$. Similarly, other characteristics can be used to determine maximum hitch angle offsets $\gamma_{o,L}$ and $\gamma_{o,R}$, including the hitch angle rate $\dot{\gamma}$, as discussed further in the '555 Application, as well as other variations and modifications of the compensation schemes discussed therein.

In a further embodiment, a method for assisting in reversing of a vehicle 14 and trailer 12 combination incorporates the use of the system 10 described above according to the above-described parameter compensation schemes and variations thereof. The method can generally involve outputting the steering signal (i.e., the desired steering angle $\delta_{des}$) to maintain the trailer 12 of the above-described vehicle 14 and trailer 12 combination along a backing path 26 that is generally straight or otherwise corresponds with a zero commanded curvature $\kappa_{2,0}$. The method can further include determining a straight backing hitch angle offset $\gamma_{o,S}$, as described above with respect to the controller 28 depicted in FIG. 11, which is done as a proportion of an integral of the measured behavior, determined, for example, as a measured instantaneous value, for a characteristic of the vehicle 14 and trailer 12 combination that varies from a predicted zero value. As discussed above, the characteristic can be any of those discussed above with respect to the known characteristics (1)-(3) of the vehicle 14 and trailer 12 combination under straight backing, which includes the vehicle yaw rate $\omega_1$, the trailer yaw rate $\omega_2$ and the steering angle $\delta$, which should be (i.e., are predicted as being) zero during straight backing of trailer 12 by vehicle 14. Accordingly, the method, by providing the straight backing hitch angle offset $\gamma_{o,S}$, can dynamically adjust the steering signal provided to the vehicle steering system 62, as discussed above, by applying the straight backing hitch angle offset $\gamma_{o,S}$. As discussed above with respect to FIG. 11, such an application can be made by subtracting the straight backing hitch angle offset $\gamma_{o,S}$ from a measured or detected value for the hitch angle $\gamma$ used to determine the desired steering angle $\delta_{des}$ in a closed loop control scheme The present method can be implemented to correct for slip in one or more of the steered wheels 64, the rear vehicle wheels 65, and the trailer wheels 67, as discussed above, due to slope S on the ground surface G on which the vehicle 14 and trailer 12 combination is positioned. In particular, the wheel slip causes the measured characteristic of the vehicle 14 and trailer 12 combination to vary from zero, providing the value used to determine the desired hitch angle offset $\gamma_o$. As discussed above, the steering signal can be used to maintain the vehicle 14 and trailer 12 combination along a backing path 26 corresponding with the opposed left R(L) and right R(R) ranges of curvature $\kappa$ such that a zero curvature value (corresponding with a center curvature value P(AR)) corresponds with straight backing. As also discussed, the method can also include outputting the steering signal to maintain the vehicle 14 and trailer 12 combination along respective maximum curved backing paths 26 that correspond with a respective one of the maximum curvatures $\kappa_{max}$. In such instances, the method can also include determining respective left and right maximum curvature offsets $\gamma_{o,L}$ and $\gamma_{o,R}$ based on a steady state error in a relevant predicted behavior, as discussed above. The method can also include interpolating a hitch angle offset function between the determined hitch angle offsets $\gamma_{o,L}$, $\gamma_{o,R}$, and $\gamma_{o,S}$ to dynamically adjust the steering signal for the desired steering angle $\delta_{des}$ using the hitch angle offset function.

It is to be understood that variations and modifications can be made on the aforementioned structure without departing from the concepts of the present disclosure, and further it is to be understood that such concepts are intended to be covered by the following claims unless these claims by their language expressly state otherwise.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A system for assisting in reversing of a vehicle-trailer combination, comprising:
   a vehicle steering system; and
   a controller:
      outputting a steering signal to the steering system to maintain the vehicle-trailer combination along a straight backing path;
      determining a straight-backing offset of a hitch angle in the vehicle-trailer combination, due to a slip in a pair of wheels in at least one of a trailer or a vehicle in the vehicle-trailer combination, as a proportion of an integral of a measured characteristic of the vehicle-trailer combination that varies from a desired zero value due to the slip.

2. The system of claim 1, wherein the controller further uses the offset of the hitch angle to dynamically adjust the steering signal.

3. The system of claim 1, wherein:
   the steering signal further maintains a trailer of the vehicle-trailer combination on a path corresponding with a commanded curvature within a range of curvature values; and
   the straight backing path corresponds with a commanded curvature of zero.

4. The system of claim 1, wherein:
   the offset of the hitch angle is further due to one of an irregularity associated with the trailer or an error in a measurement of the hitch angle; and
   the measured characteristic of the vehicle-trailer combination further varies from the desired zero value due to the one of the trailer irregularity or the error.

5. The system of claim 1, wherein the slip in the pair of wheels occurs due to a slope in a surface beneath the pair of wheels at least partially transverse to the straight backing path.

6. The system of claim 1, further including a vehicle yaw rate sensor mounted to a vehicle in the vehicle-trailer combination and in communication with the controller, wherein:
   the characteristic is a yaw rate of the vehicle; and
   the controller measures the yaw rate using an input from the vehicle yaw rate sensor.

7. The system of claim 1, further including a trailer yaw rate sensor mounted to a trailer in the vehicle-trailer combination and in communication with the controller, wherein:
   the characteristic is a yaw rate of the trailer; and
   the controller measures the yaw rate using an input from the trailer yaw rate sensor.

8. The system of claim 1, wherein:
   the vehicle steering system controls an angle of a pair of steered wheels of a vehicle in the vehicle-trailer combination and measures the angle of the pair of steered wheels during such controlling;
   the controller receives a measurement of the angle of the pair of steered wheels from the vehicle steering system; and
   the characteristic is the angle of the pair of steered wheels.

9. The system of claim 3, wherein:
   the opposing ranges of curvature include maximum curvatures at respective ends thereof; and
   the controller further:
      outputs the steering signal to the steering system to maintain the vehicle-trailer combination along a maximum-curved backing path corresponding with one of the maximum curvatures;
      determines a maximum-curvature offset of the hitch angle based on an error between a measured steady-state steering angle and a predicted steady-state steering angle based on the maximum curvature; and
      interpolates a hitch angle offset function using the straight-backing offset and the maximum-curvature offset.

10. A system for assisting in reversing of a vehicle-trailer combination, comprising:
    a vehicle steering system; and
    a controller:
       outputting a steering signal to the steering system to maintain the vehicle-trailer combination along a commanded path corresponding with opposing ranges of curvature;
       when the commanded path is a straight backing path corresponding with a curvature of zero, determining a straight-backing offset of a hitch angle in the vehicle-trailer combination;
       when the commanded path is a maximum-curvature path corresponding with one of two maximum curvatures at respective ends of the opposing ranges of curvature, determining a maximum-curvature offset of the hitch angle; and
       interpolating a hitch angle offset function using the straight-backing offset and the maximum-curvature offset.

11. The system of claim 10, wherein the controller determines the straight-backing offset of the hitch angle as a proportion of an integral of a measured behavior of a characteristic of the vehicle-trailer combination that varies from a desired zero value.

12. The system of claim 11, wherein the vehicle steering system controls an angle of a pair of steered wheels of a vehicle in the vehicle-trailer combination and measures the angle of the pair of steered wheels during such controlling;
    the controller receives a measurement of the angle of the pair of steered wheels from the vehicle steering system; and
    the characteristic is the angle of the pair of steered wheels.

13. The system of claim 10, wherein the controller determines the maximum-curvature offset of the hitch angle based on an error between a measured steady-state steering angle and a predicted steady-state steering angle based on the maximum curvature.

14. The system of claim 10, wherein the controller further uses the hitch angle offset function to dynamically adjust the steering signal.

15. A method for assisting in reversing of a vehicle-trailer combination, comprising:
    outputting a steering signal to maintain a trailer in the vehicle-trailer combination along a straight backing path;
    determining a straight-backing offset of a hitch angle in the vehicle-trailer combination as a proportion of an integral of a measured behavior of a characteristic of the vehicle-trailer combination that varies from a desired zero value, wherein the offset of the hitch angle is due to a slip in a pair of wheels in at least one of the trailer or a vehicle in the vehicle-trailer combination due to a slope in a surface beneath the pair of wheels at last partially transverse to the straight backing path and the measured behavior of the characteristic of the vehicle-trailer combination varies from the desired zero value due to the slip; and dynamically adjusting the steering signal using the straight-backing offset.

16. The method of claim 15, wherein:

the controller is configured to maintain the trailer of the vehicle-trailer combination on a commanded path corresponding with opposing ranges of curvature; and the straight backing path corresponds with a commanded curvature of zero.

17. The method of claim 16, wherein the opposing ranges of curvature include maximum curvatures at respective ends thereof; and the method further includes:

outputting the steering signal to the steering system to maintain the vehicle-trailer combination along a maximum-curved backing path corresponding with one of the maximum curvatures;

determining a maximum-curvature offset of the hitch angle based on an error between a measured steady-state steering angle and a predicted steady-state steering angle based on the maximum curvature;

interpolating a hitch angle offset function using the straight-backing offset and the maximum-curvature offset; and dynamically adjusting the steering signal using the hitch angle offset function, including using the straight-backing offset when the commanded curvature is zero.

\* \* \* \* \*